United States Patent
Wakahoi et al.

(10) Patent No.: US 7,732,079 B2
(45) Date of Patent: Jun. 8, 2010

(54) FUEL CELL STACK

(75) Inventors: Toshiya Wakahoi, Utsunomiya (JP); Naokazu Kawase, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1398 days.

(21) Appl. No.: 11/080,268

(22) Filed: Mar. 14, 2005

(65) Prior Publication Data

US 2005/0213409 A1  Sep. 29, 2005

(30) Foreign Application Priority Data

Mar. 17, 2004  (JP) ............ P 2004-076448
Jul. 7, 2004  (JP) ............ P 2004-200312

(51) Int. Cl.
*H01M 2/00* (2006.01)
*H01M 2/24* (2006.01)
*H01M 2/02* (2006.01)

(52) U.S. Cl. ............ 429/34; 429/65; 429/158; 429/163; 429/178

(58) Field of Classification Search ............ 429/34, 429/65, 158, 163, 178
See application file for complete search history.

(56) References Cited

U.S. PATENT DOCUMENTS 6,653,003 B1 * 11/2003 Tsai et al. ............ 429/17

FOREIGN PATENT DOCUMENTS

| JP | H6-72284 | 10/1994 |
|---|---|---|
| JP | 11-129396 | 5/1999 |
| JP | 11-339828 | 12/1999 |
| JP | 2000-102179 | 4/2000 |
| JP | 2002-124285 | 4/2002 |
| JP | 2003-086205 | 3/2003 |
| JP | 2003-123828 | 4/2003 |
| JP | 2003-151613 | 5/2003 |
| JP | 2004-127777 | 4/2004 |
| JP | 2004-127778 | 4/2004 |
| JP | 2004-127779 | 4/2004 |
| JP | 3909760 | 2/2007 |

* cited by examiner

*Primary Examiner*—Patrick Ryan
*Assistant Examiner*—Helen O Conley
(74) *Attorney, Agent, or Firm*—Fish & Richardson P.C.

(57) ABSTRACT

A fuel cell stack is provided with a plurality of stacked separators. This fuel cell stack includes: terminals that extend from the separators; packing in which are formed a plurality of through holes through which the terminals are inserted; a packing casing that has a packing housing concave portion that envelops side surfaces of the packing and supports a bottom surface of the packing, and has through holes through which the terminals are inserted; and a connector housing that has a pressing surface that presses a top surface of the packing. Mountain-shaped protruding portions whose apex portions are formed by circumferential edges of apertures of the respective through holes are provided on the top surface of the packing, and the pressing surfaces of the connector housing are formed in a configuration that conforms to the side surfaces of the protruding portions. Internal surfaces of the through holes in the packing are in contact without a gap in between with external surfaces of the terminals. The sealing performance in extraction portions of terminals that are used for cell voltage detection is improved.

9 Claims, 20 Drawing Sheets

FUEL CELL STACK

BACKGROUND OF THE INVENTION

1. Field of the Invention

The present invention relates to a fuel cell stack, and particularly to a waterproof structure that surrounds terminals used for voltage measurement in each cell.

Priority is claimed on Japanese Patent Application No. 2004-76448, filed Mar. 17, 2004, and No. 2004-200312, filed Jul. 7, 2004, the contents of which are incorporated herein by reference.

2. Description of Related Art

Among fuel cells that are mounted in a fuel cell vehicle or the like, there are those in which a solid polymer electrolyte membrane is sandwiched between an anode electrode and a cathode electrode so as to form a membrane electrode structure. This membrane electrode structure is sandwiched between a pair of separators so as to form a cell (i.e., a unit fuel cell). In this type of fuel cell, typically, a plurality of cells are stacked and used as a fuel cell stack.

In this fuel cell, if fuel gas (for example, hydrogen gas) is supplied to the anode electrode and oxidizing gas (for example, air that contains oxygen) is supplied to the cathode electrode, then the hydrogen gas is ionized at the anode electrode, and moves into the solid polymer electrolyte membrane. Electrons then pass through an external load and move into the cathode electrode, where they react with oxygen to create water. Electrical energy can be extracted from this series of electrochemical reactions.

In this type of fuel cell, in order to determine whether or not each cell is in a normal state when in operation, the voltage between separators that constitute each cell (referred to below as the cell voltage) is measured, and the power generating state of each cell is controlled.

As is described, for example, in Japanese Patent Application Unexamined Publication No. 11-339828, a conventional technique is known for connecting lead wires, which are connected to a cell voltage detection circuit, to the separators that employs a structure in which a socket shaped connector that is provided at a distal end of the lead wires is inserted into terminals formed in the separators.

In a fuel cell, in order to avoid short-circuiting between cells that is caused by water entering from the outside, it is necessary for waterproofing treatment to be performed around the terminals. However, providing an individual waterproofing member for each of the large number of terminals that is equal to the number of stacked separators is extremely complicated and gives rise to poor productivity.

Therefore, the present invention provides a fuel cell stack that enables a terminal group made up of a plurality of terminals to be waterproofed all together without a waterproofing member needing to be provided individually for each terminal, and that has a waterproofing mechanism with excellent sealing properties.

SUMMARY OF THE INVENTION

In order to solve the above described problems, according to an aspect of the present invention, there is provided a fuel cell stack (for example, the fuel cell stack 1 in the embodiments described below) that is provided with a plurality of stacked separators (for example, the separators 2 in the embodiments described below), comprising: terminals (for example, the terminals 3 in the embodiments described below) that extend from an optional one of the separators; packing (for example, the packing 20 in the embodiments described below) in which are formed a plurality of through holes (for example, the through holes 21 in the embodiments described below) through which the terminals are inserted; a packing casing (for example, the packing casing 11 in the embodiments described below) that has a packing housing concave portion (for example, the packing housing concave portion 12 in the embodiments described below) that envelops side surfaces of the packing (for example, the side surfaces 27 in the embodiments described below) and supports a bottom surface (for example, the bottom surface 22 in the embodiments described below) of the packing, and has through holes (for example, the through holes 13 in the embodiments described below) through which the terminals are inserted; and a connector member (for example, the connector housing 30 in the embodiments described below) that has a pressing surface (for example, the internal surfaces 32a of the tapered holes 32 in the embodiment described below) that presses a top surface (for example, the top surface 23 in the embodiments described below) of the packing, wherein internal surfaces of the through holes in the packing are in contact without a gap in between with external surfaces of the terminals.

With this structure, the sealing performance between the through holes in the packing and the terminals is improved, and the terminals can be positioned and placed in rows accurately.

Preferably, in the above described fuel cell stack, the internal surfaces of the through holes in the packing are in contact without a gap in between with the external surfaces of the terminals before the packing is pressed.

With this structure, when the packing is pressed and compressed, the internal surfaces of the through holes in the packing can be placed in tight press contact with the external surfaces of the terminals.

Preferably, in the above described fuel cell stack, mountain-shaped protruding portions (for example, the protruding portions 25 in the embodiment described below) whose apex portions (for example, the apex portions 25a in the embodiment described below) are formed by circumferential edges of apertures of the respective through holes are provided on the top surface of the packing, and the pressing surfaces are formed in a configuration that conforms to the side surfaces (for example, the side surfaces 25b in the embodiment described below) of the protruding portions.

With this structure, the contact area (namely, the area of the seal portion) between the protruding portions of the packing and the pressing surfaces of the connector member can be increased. In addition, because the side surfaces the protruding portions of the packing are compressed by a force exerted obliquely inwards from the pressing surfaces of the connector member, the internal surfaces of the through holes in the packing are in tighter press-contact with the external surfaces of the terminals.

Preferably, in the above described fuel cell stack, there is no ridge line on the side surfaces of the protruding portions.

With this structure, the followingness of the protrusions in the packing relative to the pressing surface when the packing is deformed by being compressed is excellent, and the sealing performance relative to the pressing surface can be further improved.

Preferably, in the above described fuel cell stack, each of the through holes in the packing comprises a bottom portion through hole and a top portion through hole located above the bottom portion through hole in conformity with the terminal comprising a base portion covered by resin and a distal end portion located above the base portion and having an exposed metal surface, the top portion through hole having a horizontal cross section smaller than that of the bottom portion through hole.

Preferably, in the above described fuel cell stack, the packing is provided with a lip seal that encloses through holes on a bottom surface of the packing.

According to another aspect of the present invention, there is provided a fuel cell stack (for example, the fuel cell stack 1 in the embodiments described below) that is provided with a plurality of stacked separators (for example, the separators 2 in the embodiments described below), comprising: terminals (for example, the terminals 3 in the embodiments described below) that extend from an optional one of the separators; packing (for example, the packing 20 in the embodiments described below) that has a plurality of through holes (for example, the through holes 21 in the embodiments described below) through which the terminals are inserted, and that has an independent circumferential wall portion (for example, the protrusions 28 in the embodiments described below) for each through hole; a packing casing (for example, the packing casing 11 in the embodiments described below) that has a packing housing concave portion (for example, the packing housing concave portion 12 in the embodiments described below) that envelops the packing and supports a bottom surface (for example, the bottom surface 22 in the embodiment described below) of the packing, and has through holes (for example, the through holes 13 in the embodiment described below) through which the terminals are inserted; and a connector member (for example, the connector housing 30 in the embodiment described below) that has a pressing surface (for example, the tapered surfaces 37*a*, the bulge portions 37*b*, and the flat surfaces 37*c* in the embodiment described below) that presses a top surface (for example, the protruding portions 25 in the embodiment described below) and side surfaces (for example, the side surfaces 28*a* in the embodiment described below) of the respective circumferential wall portions of the packing, wherein bulge portions (for example, the bulge portions 29 and 37*b* in the embodiments described below) are provided on at least one of the side surfaces of the circumferential wall portions and the pressing surfaces that press these side surfaces, and the bulge portions protrude towards so as to be in press contact with the other of the side surfaces of the circumferential wall portions and the pressing surfaces, and internal surfaces of the through holes in the packing are in contact without a gap in between with external surfaces of the terminals.

With this structure, the sealing performance between the through holes in the packing and the terminals is improved, and the terminals can be positioned and placed in rows accurately. In particular, in locations where the bulge portions have been provided, because it is possible to place the internal surfaces of the through holes in the packing in close contact with the external surfaces of the terminals, the sealing performance is increased.

Preferably, in the above described fuel cell stack, the internal surfaces of the through holes in the packing are in contact without a gap in between with the external surfaces of the terminals before the packing is pressed.

With this structure, when the packing is pressed and compressed, the internal surfaces of the through holes in the packing can be placed in tight press contact with the external surfaces of the terminals.

Preferably, in the above described fuel cell stack, mountain-shaped protruding portions (for example, the protruding portions 25 in the embodiments described below) whose apex portions (for example, the apex portions 25*a* in the embodiments described below) are formed by circumferential edges of apertures of the respective through holes are provided on the top surface of the circumferential wall portions of the packing, and the pressing surfaces (for example, the tapered surfaces 37*a* in the embodiments described below) that press these top surfaces are formed in a configuration that conforms to the mountain-shaped configuration of the protruding portions.

With this structure, the contact area (namely, the area of the seal portion) between the protruding portions of the packing and the pressing surfaces of the connector member can be increased. In addition, because the protruding portions of the packing are compressed by a force exerted obliquely inwards from the pressing surfaces of the connector member, the internal surfaces of the through holes in the packing are in tighter press-contact with the external surfaces of the terminals.

Preferably, in the above described fuel cell stack, the circumferential wall portions of the packing have no ridge line in a circumferential direction thereof.

With this structure, the followingness of the packing relative to the pressing surface when the packing is deformed by being compressed is excellent, and the sealing performance relative to the pressing surface can be further improved.

Preferably, in the above described fuel cell stack, each of the through holes in the packing comprises a bottom portion through hole at a lower side of the circumferential wall portion of the packing and a top portion through hole at an upper side of the circumferential wall portion, and wherein the bulged portions are provided on the pressing surfaces of the connector member such that an upper portion of the pressing surfaces presses the upper side of the circumferential wall portion and the bulged portions press the lower side of the circumferential wall portion.

Preferably, in the above described fuel cell stack, the packing casing comprises an O-ring that encircles the packing housing concave portion.

DETAILED DESCRIPTION OF THE INVENTION

The first embodiment of the fuel cell stack of the present invention will now be described with reference made to the drawings of FIGS. 1 through 10.

Figure 1:
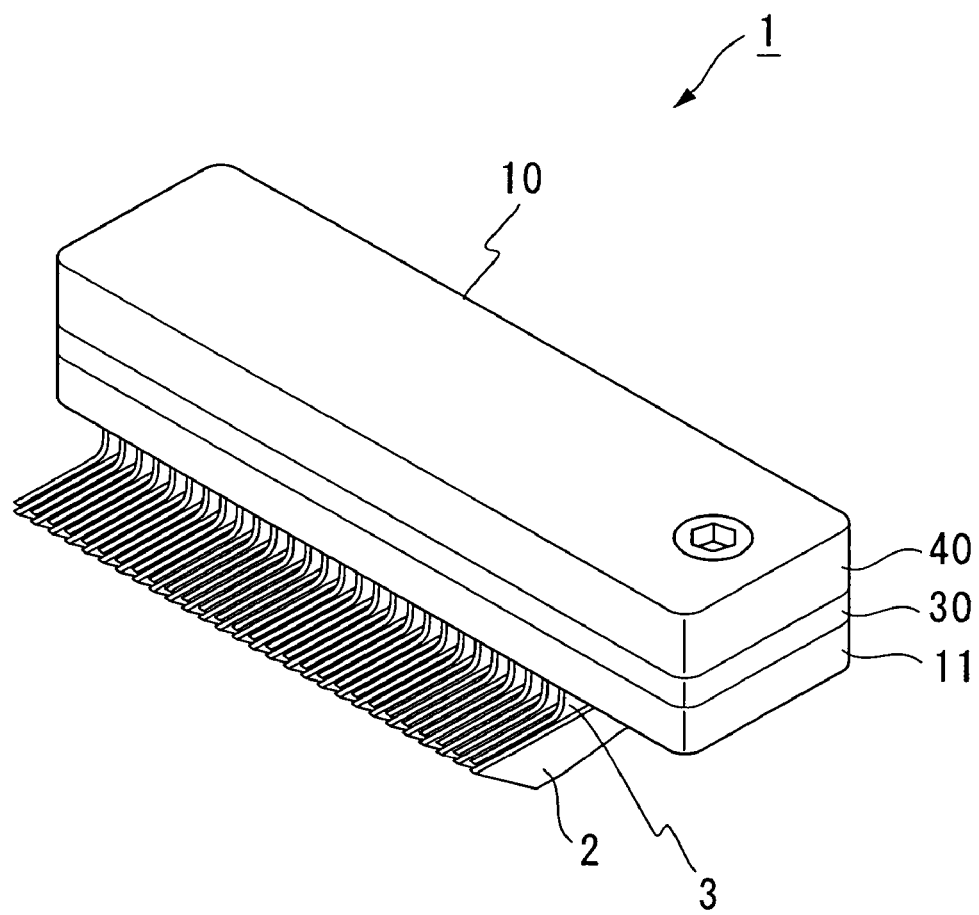
FIG. 1 is an external perspective view of a connector unit of a first embodiment of the fuel cell stack of the present invention.

As is shown in FIG. 1, a fuel cell stack 1 is formed by stacking a plurality of separators 2 that sandwich membrane electrode structures (not shown) inside a stack housing (not shown). The fuel cell stack 1 is also provided with a connector unit that measures a voltage between adjacent separators 2 and 2.

Figure 2:
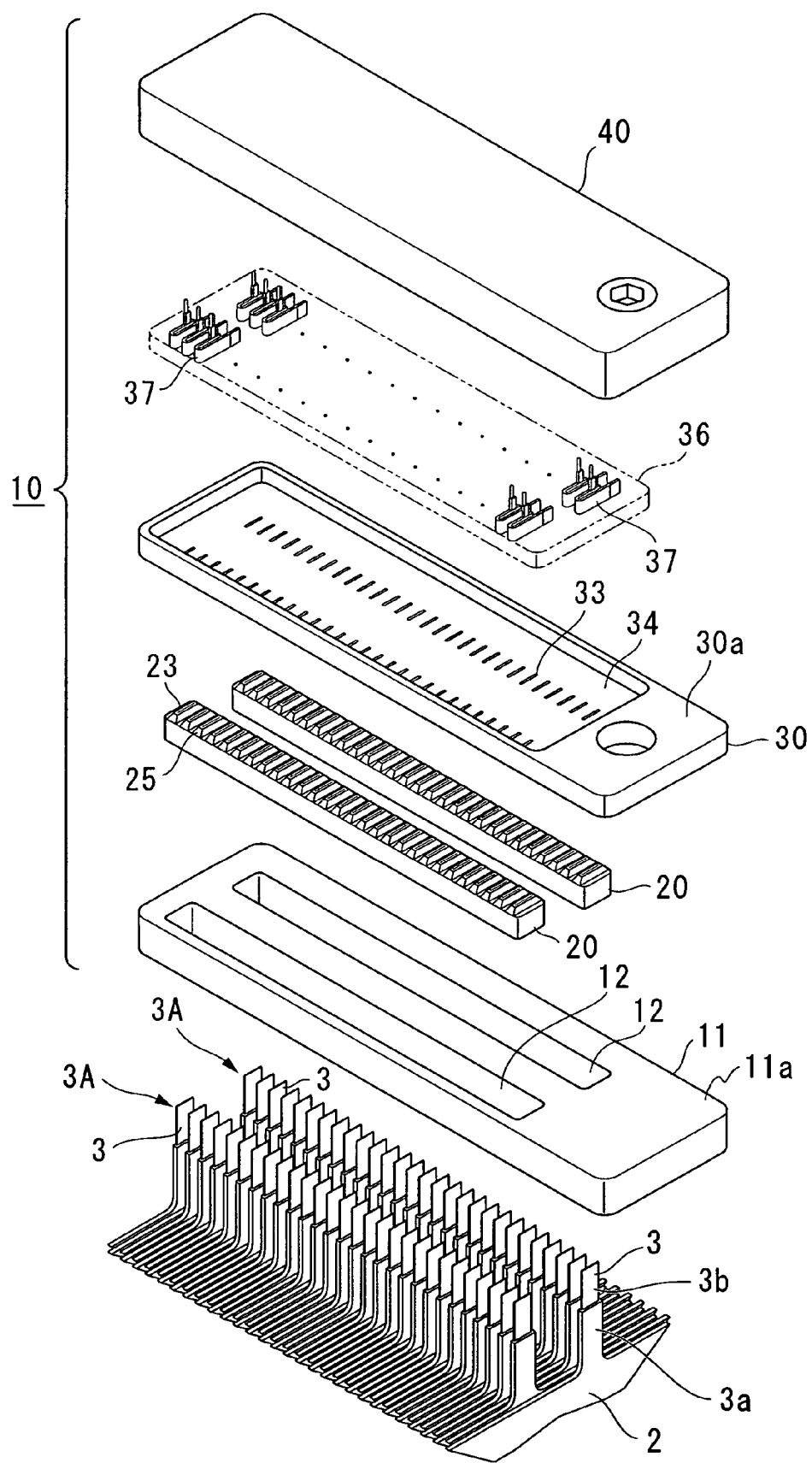
FIG. 2 is an exploded perspective view of the connector unit of this embodiment.

As is shown in FIG. 2, the separators 2 are provided with plate-shaped terminals 3 that extend upwards from a top end portion of the separators 2. In a state in which the separators 2 are stacked, the placement positions of the terminals 3 are offset from each other in adjacent separators 2 and 2. As a result, two columns of terminal groups 3A and 3A are formed running in the stacking direction. Base portions 3a of these terminals 3 are coated in resin, while metal surfaces of distal end portions 3b thereof are exposed. The base portions 3a are inserted through windows (not shown) in the stack housing, and the distal end portions 3b protrude towards the connector unit 10.

The connector unit 10 is provided with a packing casing 11, two packings 20 and 20, a connector housing 30, and a cover 40.

The packing casing 11 is a member that is installed on a top portion of the stack housing. Packing housing concave portions 12 that are formed in a narrow, elongated shape running in the stacking direction of the separators 2 are provided in a relationship of 1 to 1 with each terminal group 3A on a top surface 11a of the packing casing 11 in positions corresponding to the terminal groups 3A and 3A.

Figure 3:
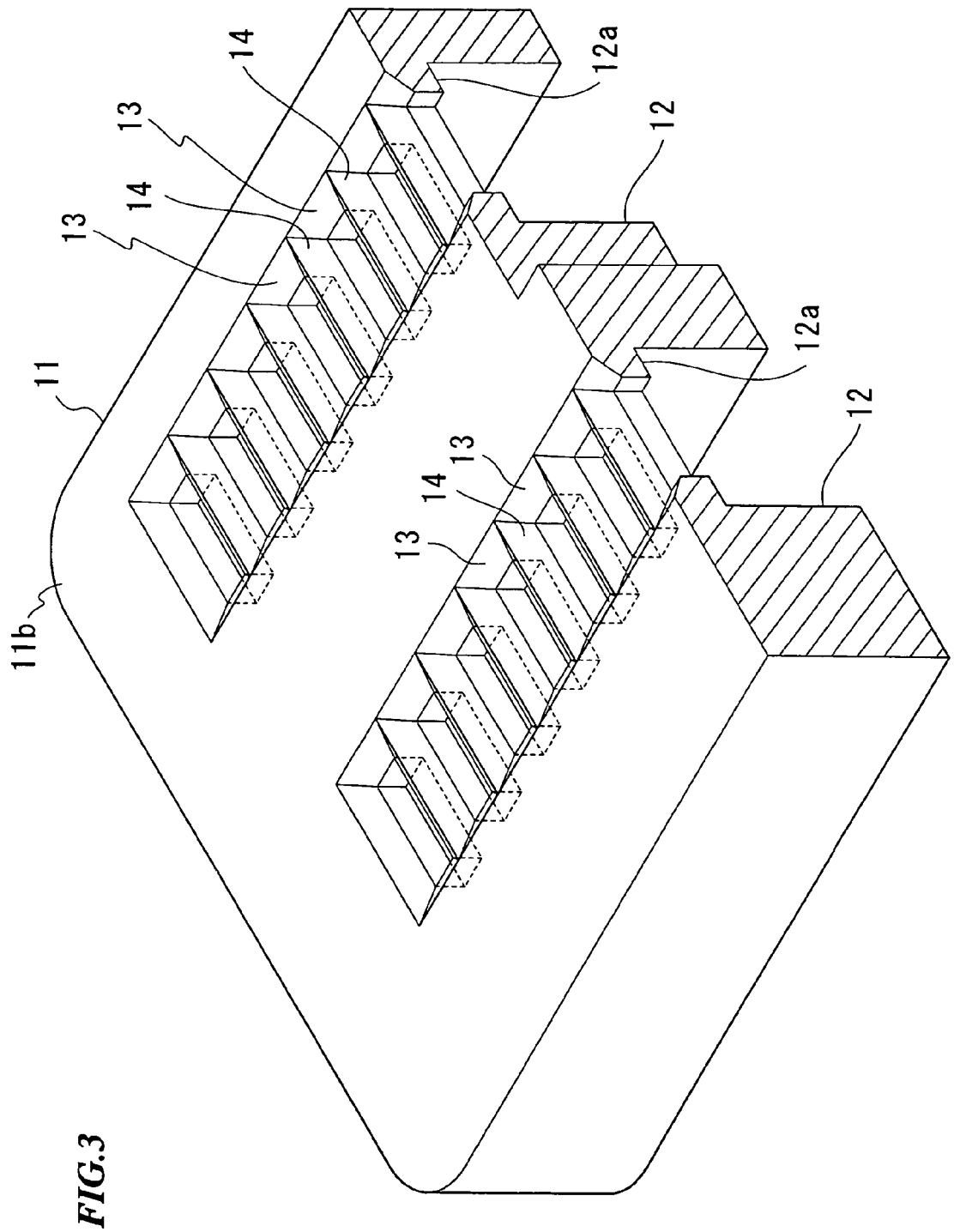
FIG. 3 is a perspective view of a packing casing used in this embodiment as seen from the bottom surface side.

FIG. 3 is a view showing an upside-down packing casing 11. Through holes 13 that penetrate the packing housing concave portions 12 from a bottom surface 11b are provided in a relationship of 1 to 1 with each terminal 3 at positions that correspond to the respective terminals 3 in the bottom surface 11b of the packing casing 11. A bridge portion 14 is provided between adjacent through holes 13 and 13 in the same terminal group 3A. Top surfaces of the bridge portions 14 (i.e., the surface located on the bottom side in FIG. 3) are flush with a bottom surface 12a of the packing housing concave portions 12. The through holes 13 are formed at a size that enables a gap to be left when the terminals 3 are inserted therein, and the bottom side of the through holes 13 is formed as a tapered hole while the top side thereof is formed as a straight hole.

The packings 20 and 20 are formed from an elastic material, and they are contained respectively in the packing housing concave portions 12 of the packing casings 11. Examples of the elastic material used to form the packings 20 include nitrile rubber (NBR), hydrogenated nitrile rubber (HNBR), fluoro rubber (FKM, FFKM), acrylic rubber (ACM), silicone rubber (VMQ, FVMQ), urethane rubber (AU, EU), ethylene propylene rubber (EPM, EPDM), chloroprene rubber (CR), chlorosulfonated polyethylene (CSM), epichlorohydrin rubber (CO, ECO), isoprene rubber (IR), styrene butadiene rubber (SBR), butadiene rubber (BR), novornene rubber (NOR), natural rubber, and other thermoplastic elastomers.

The planar configuration and planar dimensions of the packings 20 are set such that the packings 20 can be housed in the packing housing concave portions 12 with substantially no gap between the two. Through holes 21 through which the terminals 3 are inserted are formed in the packings 20 extending from the bottom surface 22 to the top surface 23. These through holes 21 are provided in a relationship of 1 to 1 with each terminal 3.

As is shown in FIGS. 6 to 9, a bottom side portion of each through hole 21 is formed as a bottom portion through hole 21a through which the base portion 3a, which is covered by resin, of the terminal 3 is inserted. The top side portion of each through hole 21 is formed as a top portion through hole 21b through which the distal end portion 3b, which has exposed metal surfaces, of the terminal 3 is inserted. A horizontal cross section of the top portion through hole 21b is set so as to be smaller than that of the bottom portion through hole 21a. Moreover, a horizontal cross section of the bottom portion through hole 21a is set so as to be slightly smaller than the horizontal cross section of the base portion 3a of a terminal 3. In addition, the horizontal cross section of the top portion through hole 21b is set so as to be slightly smaller than the horizontal cross section of the distal end portion 3b of a terminal 3. A bottom edge portion of the bottom portion through hole 21a is formed as a tapered hole 21c that widens as it approaches the bottom.

Figure 6:
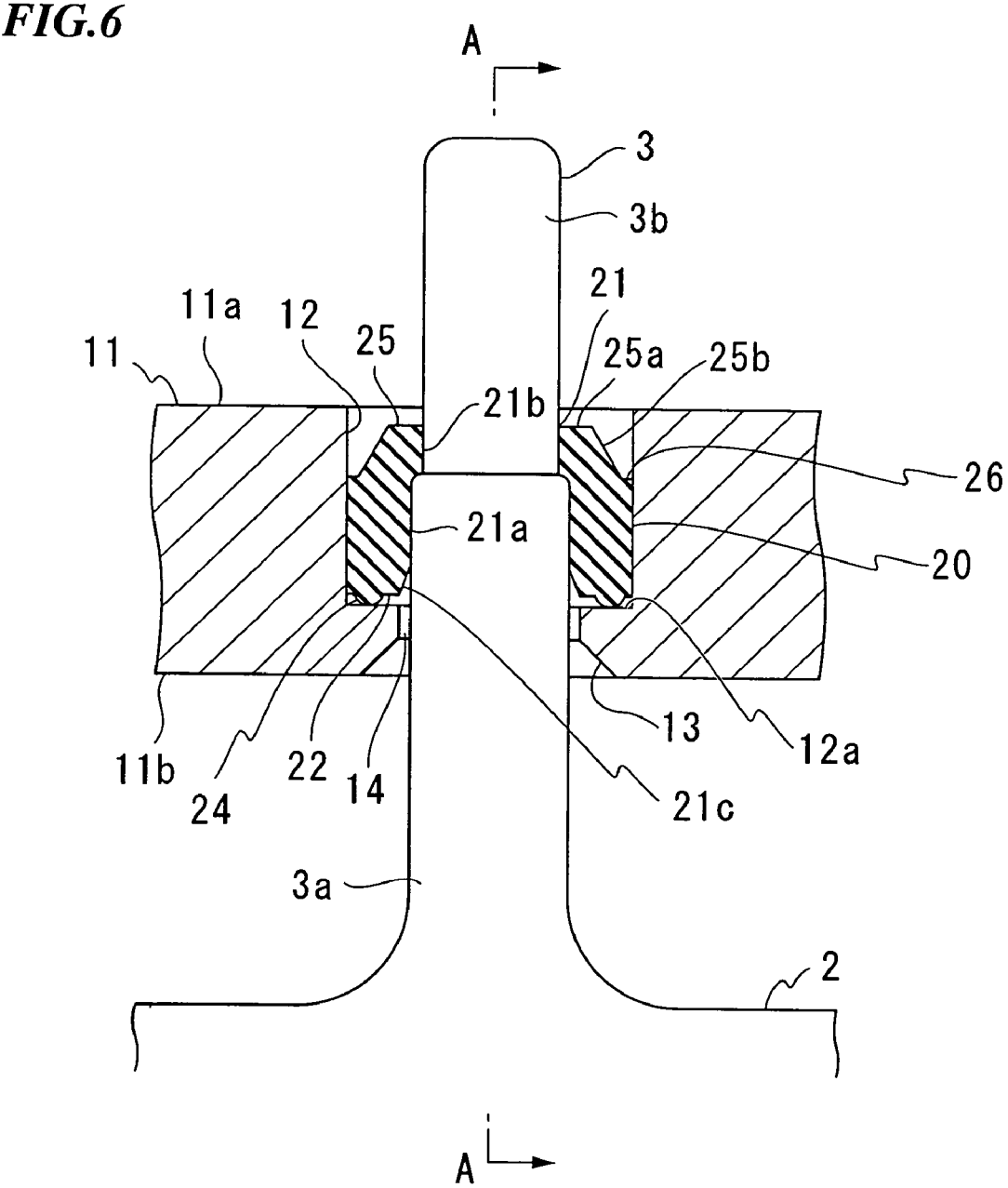
FIG. 6 is an enlarged cross-sectional view of the principal portions showing a state before the packing is compressed in the connector unit of this embodiment.
Figure 7:
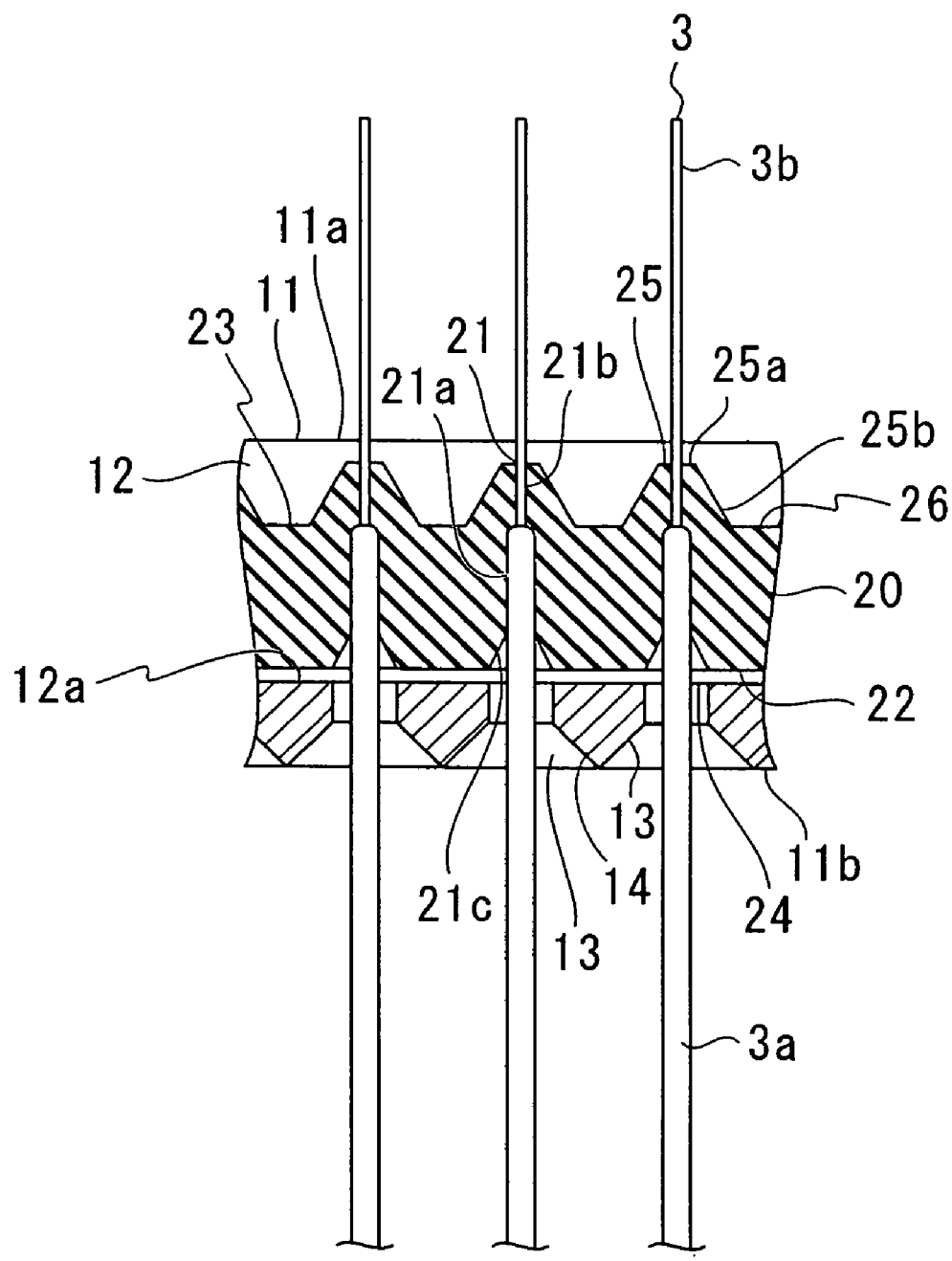
FIG. 7 is a cross-sectional view taken along the line A-A in FIG. 6.

As is shown in FIG. 6 and FIG. 7, a lip seal portion 24 is formed in a toroidal shape by a single protruding bar so as to enclose all the through holes 21 on a bottom surface 22 of the packing 20.

Figure 4:
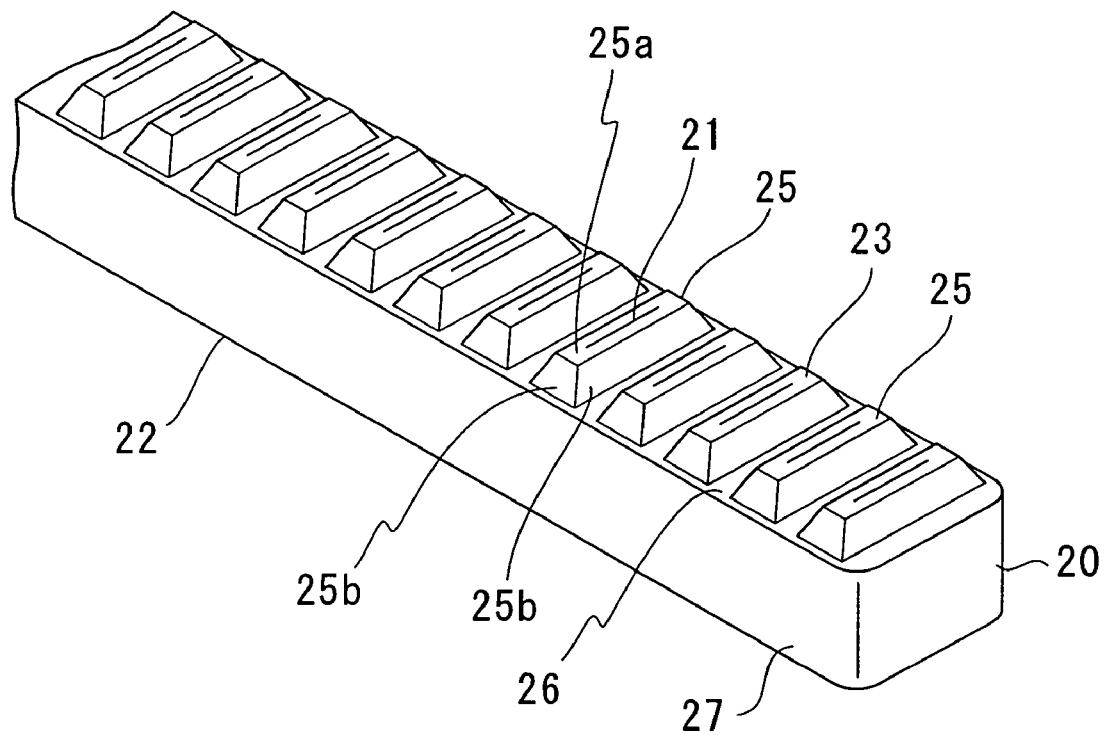
FIG. 4 is an external perspective view of packing used in this embodiment.

As is shown in FIG. 4, a top surface 23 of the packing 20 is structured such that a number of protruding portions 25 that are formed as truncated pyramids protrude from a flat portion 26. More specifically, the protruding portions 25 form quadrangular pyramid base shapes (namely, quadrangular pyramids with the top portion removed) that are made up of a flat apex portion 25a and four side surfaces 25b that are connected to the flat apex portion 25a and gradually widen towards the ends thereof. A top portion through hole 21b is provided in the center of each apex portion 25a. As is shown in FIGS. 6 to 9, the boundary between each bottom portion through hole 21a and top portion through hole 21b is positioned at substantially the same height as the flat portion 26. Note that when the packing 20 is contained inside the packing housing concave portion 12, the packing housing concave portion 12 envelops side surfaces 27 of the packing 20, and supports the bottom surface 22 of the packing 20.

The connector housing 30 is placed on top of the packing casing 11, and applies pressing force to the packings 20 so as to compress the packings 20. The planar configuration and planar dimensions of the connector housing 30 are the same as those of the packing casing 11.

Figure 5:
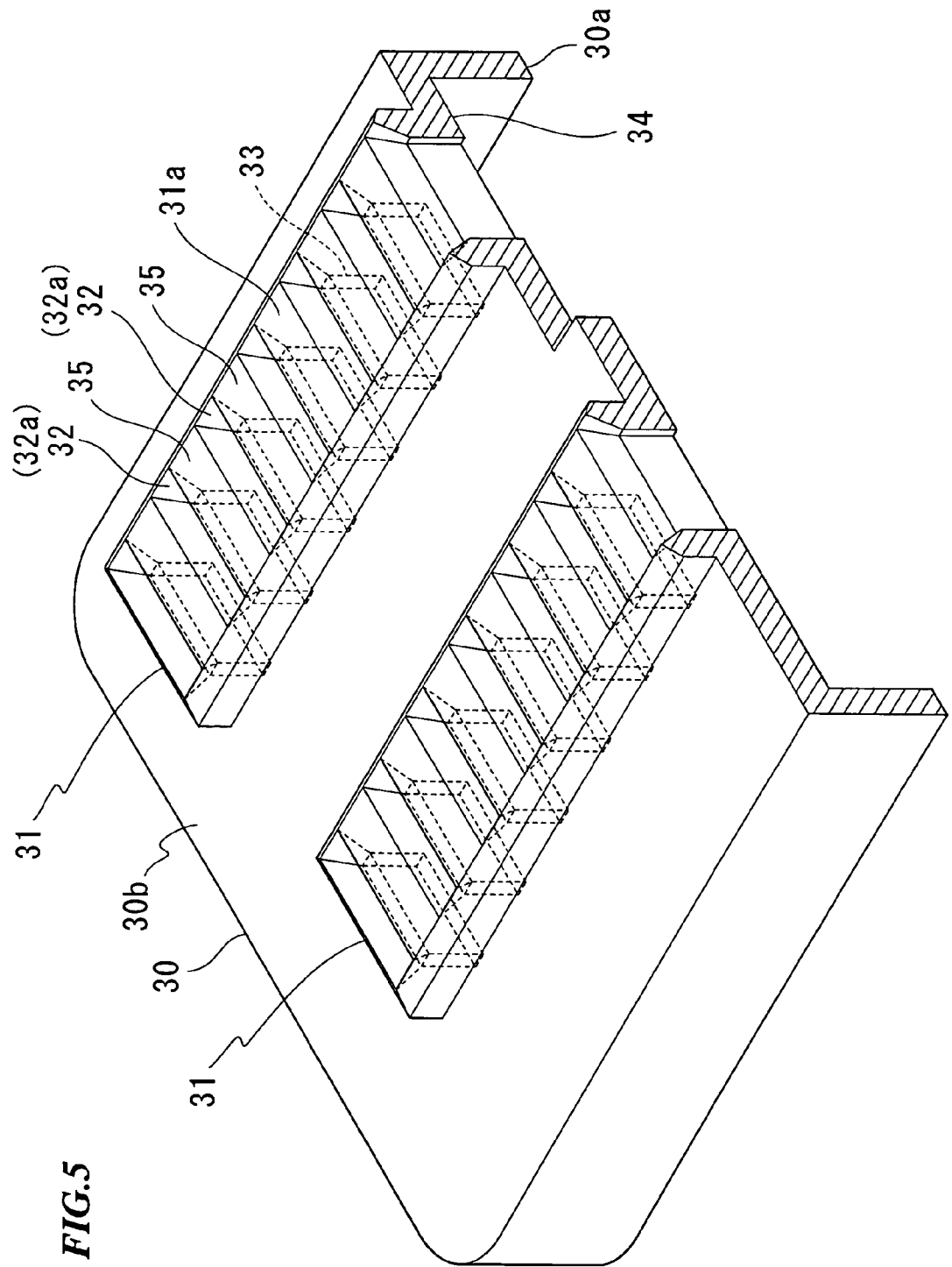
FIG. 5 is a perspective view of a connector housing used in this embodiment as seen from the bottom surface side.

FIG. 5 is a view showing an upside-down connector housing 30. Narrow elongated protruding portions 31 and 31 are provided in parallel with each other at positions corresponding to the respective terminal groups 3A and 3A on the bottom surface 30b of the connector housing 30. The planar configuration and planar dimensions of each protruding portion 31 are set such that they can be inserted in the packing housing concave portions 12 of the packing casing 11 so that substantially no gap is left. Tapered holes 32, whose shape matches the side surfaces 25b of the protruding portions 25 of the packing 20 and whose bottom surface 31a side is enlarged, are provided at positions corresponding to each terminal 3 on the bottom surface 31a of each protruding portion 31 (i.e., on the upper surface as seen in FIG. 5). Straight holes 33 continue from top portions of the tapered holes 32. Internal surfaces 32a of the tapered holes 32 form pressing surfaces that press the side surface 25b of the protruding portions 25 of the packing 20. The straight holes 33 open onto a connector housing concave portion 34 that is provided in a top surface 30a of the connector housing 30. The protruding portions 31 have bridge portions 35 between adjacent tapered holes 32 and 32.

As is shown in FIG. 2, a number of connectors 37 that are supported on a connector holder 36 are housed in the connector housing concave portion 34 of the connector housing 30. The connectors 37 are provided at positions corresponding to the respective straight holes 33, and are connected to a voltage measuring circuit substrate (not shown). When the connector unit 10 is correctly installed, the distal end portions 3b of the terminals 3 in each separator 2 are connected to each of the connectors 37.

The cover 40 is installed above the connector housing 30 and covers the connector housing concave portion 34. The planar configuration and planar dimensions thereof are the same as those of the connector housing 30.

Next, the procedure for attaching the connector unit 10 to the stack housing will be described. Note that, in the present embodiment, the connectors 37 are fixed in advance in the connector housing concave portion 34 of the connector housing 30.

Firstly, the terminals 3 of each separator 2 are inserted into the respective through holes 13 of the packing casing 11. In addition, the packing casing 11 is fixed by screws to the stack housing (not shown). When the packing casing 11 is fixed to the stack housing, each of the terminals 3 that has been inserted through the through holes 13 is in a state of protruding upwards inside the packing housing concave portions 12 of the packing casing 11.

Next, the packings 20 are placed inside the packing housing concave portions 12 while the respective terminals 3 are inserted in the through holes 21 in the packings 20. Here, because the horizontal cross sections of the through holes 21 in the packings 20 are slightly smaller than the horizontal cross sections of the terminals 3, the internal surfaces of the bottom portion through holes 21a are in tight contact with the external surfaces of the base portions 3a of the terminals 3, and the internal surfaces of the top portion through holes 21b are in tight contact with the external surfaces of the distal end portions 3b of the terminals 3. FIGS. 6 and 7 show states when the placing of the packings 20 inside the packing housing concave portions 12 has been completed. At this time, the bottom surfaces 12a of the packing housing concave portions 12 are in contact with the lip seal portions 24 of the packings 20 so as to support the packings 20 from beneath, and the inner side surfaces of the packing housing concave portions 12 envelop the side surface 27 of the packings 20. In addition, the apex portions 25a of the packings 20 are positioned slightly lower than the top surface 11a of the packing casing 11, and the distal end portions 3b of the respective terminals 3 that penetrate the respective through holes 21 are in a state of protruding upwards beyond the top surface 11a of the packing casing 11. Accordingly, in the terminals 3, the base portions 3a that are covered by resin remain inside the through holes 21 in the packings 20, and only the distal end portions 3b whose metal surfaces are exposed are exposed from the packings 20.

Next, the protruding portions 31 and 31 of the connector housing 30 are inserted into the packing housing concave portions 12 and 12 of the packing casing 11 while the respective terminals 3 that protrude from the packings 20 are being inserted into the tapered holes 32 and the straight holes 33 of the connector housing 30. The tapered holes 32 of the protruding portions 31 cover the protruding portions 25 of the packings 20. Note that because the internal surfaces 32a of the tapered holes 32 are configured so as to match the side surfaces 25b of the protruding portions 25, the internal surfaces 32a of the tapered holes 32 are in surface contact substantially uniformly with the side surfaces 25b of the protruding portions 25. Note also that the height of the protruding portions 31 is set in advance such that, in a state in which the tapered holes 32 cover the protruding portions 25, a gap of a predetermined size is created between the bottom surface 30b of the connector housing 30 and the top surface 11a of the packing casing 11.

Moreover, in a state in which the tapered holes 32 cover the protruding portions 25, the respective terminals 3 that penetrate the straight holes 33 are in a state of protruding upwards inside the connector housing concave portions 34, and each of the connectors 37 is connected to a distal end portion 3b of the terminals 3.

Figure 8:
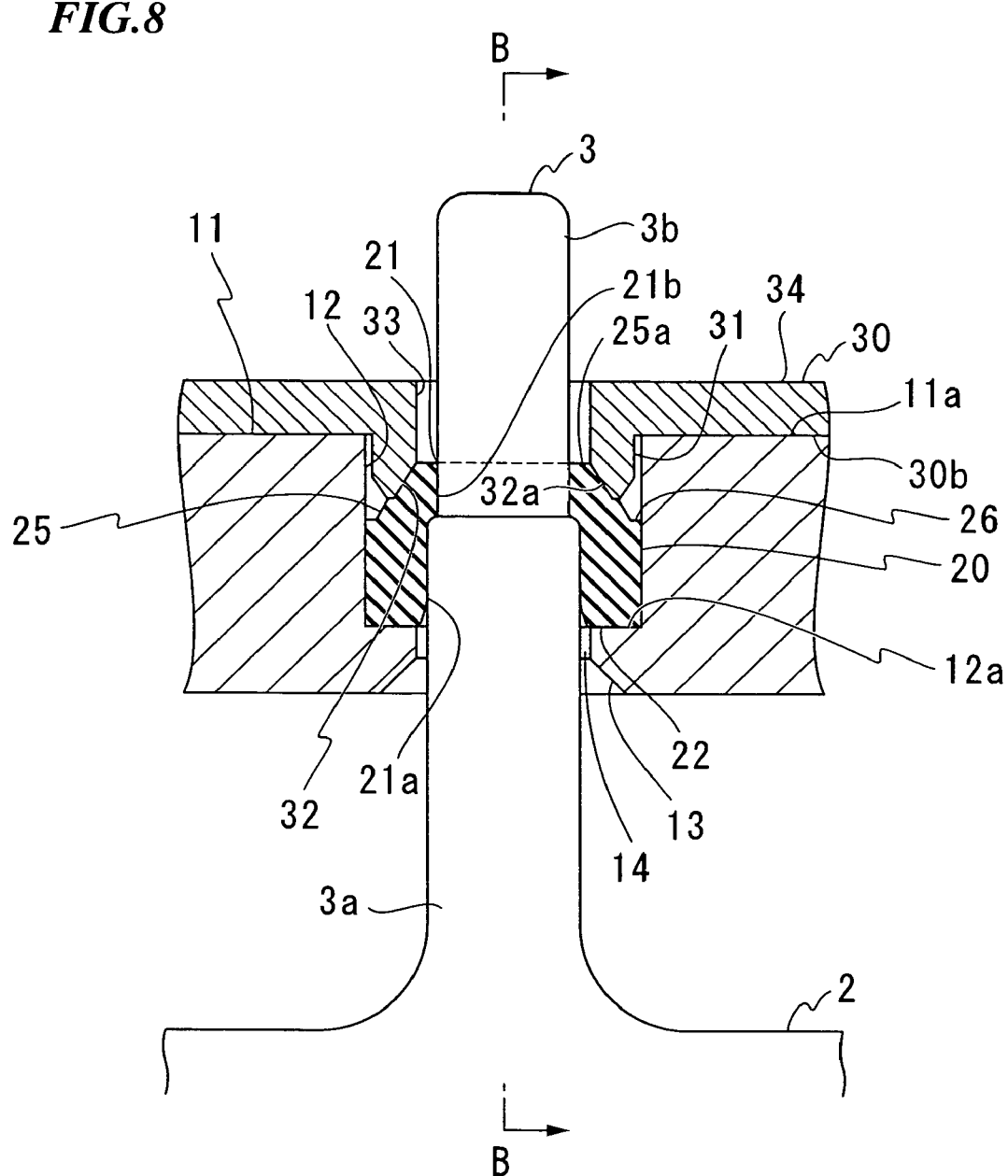
FIG. 8 is an enlarged cross-sectional view of the principal portions showing a state after the packing has been compressed in the connector unit of this embodiment.
Figure 9:
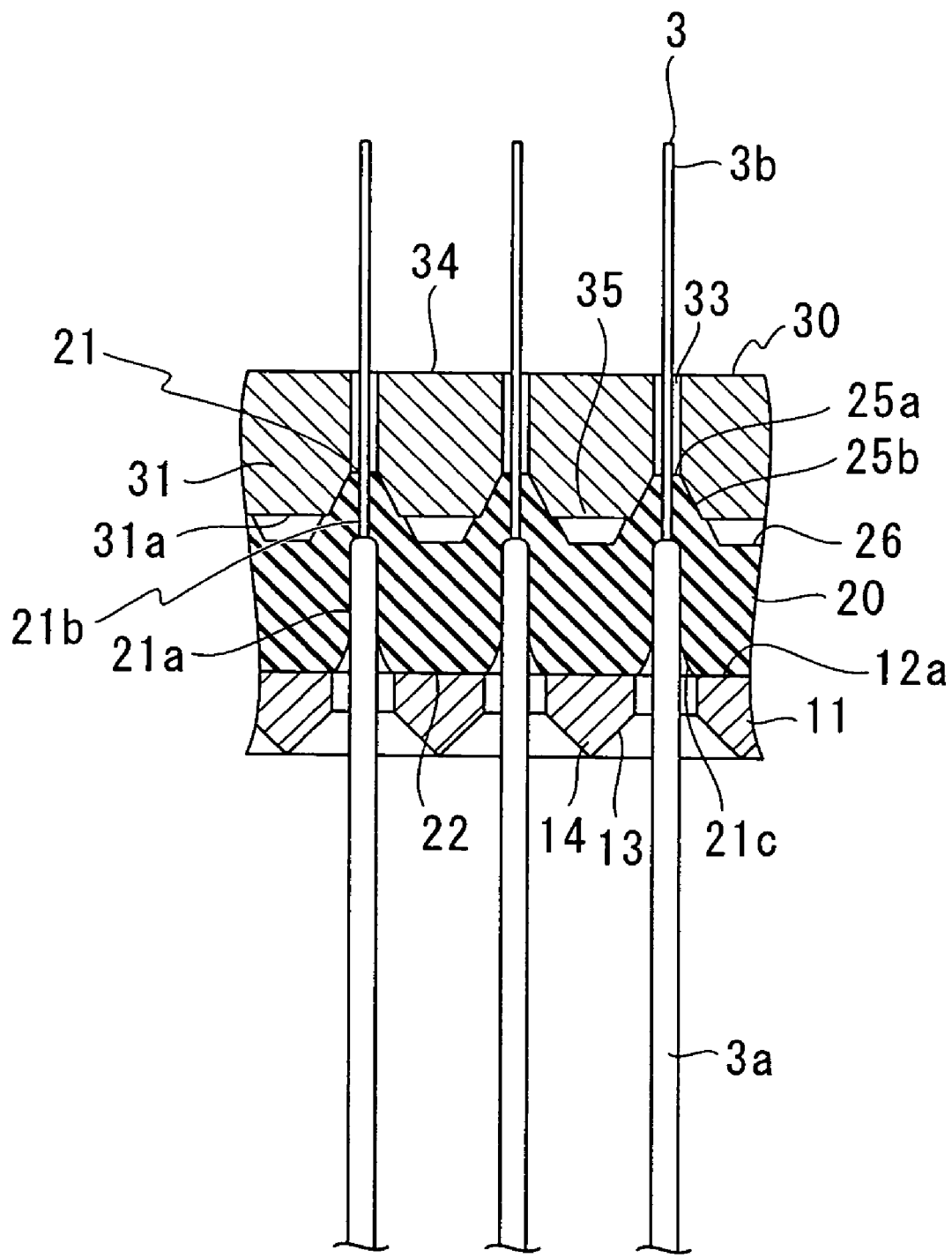
FIG. 9 is a cross-sectional view taken along the line B-B in FIG. 8.

Next, the cover 40 is placed on the connector housing 30 and, together with the connector housing 30 and the packing casing 11, it is fastened to the stack housing by bolts (not shown). As a result, the protruding portions 31 of the connector housing 30 press the packings 20 so that the packings 20 are compressed, and, as is shown in FIGS. 8 and 9, the bottom surface 30b of the connector housing 30 is placed in contact with the top surface 11a of the packing casing 11. FIGS. 8 and 9 show states in which this fastening is completed, however, the connectors 37 and the cover 40 have been omitted from these drawings.

In a fastened state, the lip seal portions 24 of the packings 20 are compressed, and are substantially flush with the bottom surfaces 22. The lip seal portions 24 are placed in firm pressure contact with the bottom surfaces 12a of the packing housing concave portions 12 of the packing casing 11. Because of this, it is possible to reliably seal the area surrounding the through holes 13, and it is possible to reliably prevent moisture from the outside from encroaching into the stack housing via the gaps between the internal surfaces of the packing housing concave portions 12 and the external surfaces of the packings 20.

In a fastened state when the lip seal portions 24 are compressed, because the bottom surfaces 22 of the packings 20 are supported by the bottom surfaces 12a and the bridge portions 14 of the packing housing concave portions 12, and because the packings 20 are compressed while the inner surfaces 32a of the tapered holes 32 in the connector housing 30 are in surface contact with the four side surfaces 25b of the protruding portions 25 of the packings 20, the protruding portions 25 of the packings 20 are compressed by a force exerted obliquely inwards at all of the four side surfaces 25b. As a result, because the internal surfaces of the through holes 21 in the packings 20 are in tighter press-contact with the external surfaces of the terminals 3, the peripheries of the through holes 21 can be reliably sealed, and it is possible to reliably prevent moisture from the outside from encroaching into the stack housing via the gaps between the through holes 21 in the packings 20 and the terminals 3.

In addition, because the side surfaces 25b of the protruding portions 25 of the packings 20 are slanted, the contact area (namely, the area of the seal portion) between the side surfaces 25b and the internal surfaces 32a of the tapered holes 32 can be increased, and the performance of the seal in the tapered holes 32 can be increased. Accordingly, it is possible to reliably prevent moisture from the outside from encroaching into the stack housing via the gaps between the tapered holes 32 in the connector housing 30 and the protruding portions 25 of the packings 20.

In this manner, according to the fuel cell stack 1 of the present embodiment, because it is possible to reliably seal the areas between the packing housing concave portion 12 of the packing casing 11 and the packing 20, and between the through holes 21 in the packing 20 and the terminals 3, and between the tapered holes 32 in the connector housing 30 and the packing 20, it is possible to reliably prevent moisture from encroaching from the outside into the stack housing, and it is possible to prevent short-circuiting inside the stack housing such as short-circuiting between cells.

Moreover, because it is possible to group together the plurality of terminals 3 that constitute the terminal group 3A and to seal them using a single packing 20, the waterproof structure of the connector unit 10 can be simplified. Furthermore, because the positioning of the terminals 3 can be performed simply and accurately, the connections between the terminals 3 and the connectors 37 can be made easily.

Further Examples

Note that the present invention is not limited to the above described embodiment.

Figure 10:
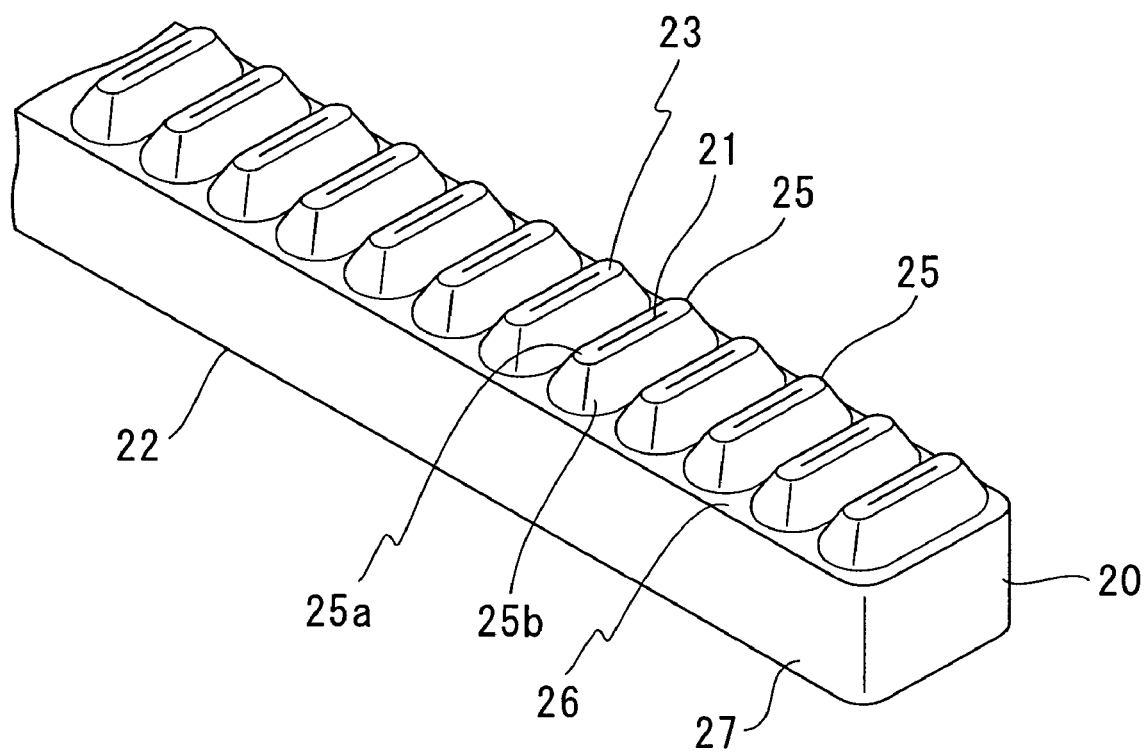
FIG. 10 is an external perspective view showing another example of packing.

For example, as is shown in FIG. 10, it is possible to form the side surfaces 25b of the protruding portions 25 of the packings 20 with the left and right end portions joined by curved surfaces such that a ridge line is not created. The tapered holes 32 in the connector housing 30 are also formed with the same configuration. If this type of structure is employed, then because there is no ridge line on the side surfaces 25b of the protruding portions 25 of the packings 20, the followingness of the packings 20 to the inner surfaces 32a of the tapered holes 32 when the packings 20 are deformed by being compressed is excellent, and the adhesion of the packings 20 to the tapered holes 32 is increased. As a result, the sealing properties can be further improved.

Moreover, in the above described embodiment, terminals 3 are provided for all the separators 2, however, it is also possible for the terminals 3 to be provided for just a portion of the separators 2.

A further embodiment of the fuel cell stack of the present invention will now be described with reference made to FIGS. 11 through 20.

The exterior structure of the fuel cell stack of the present embodiment can be made the same as that of the fuel cell stack 1 (see FIG. 1) of the above described embodiment.

Figure 11:
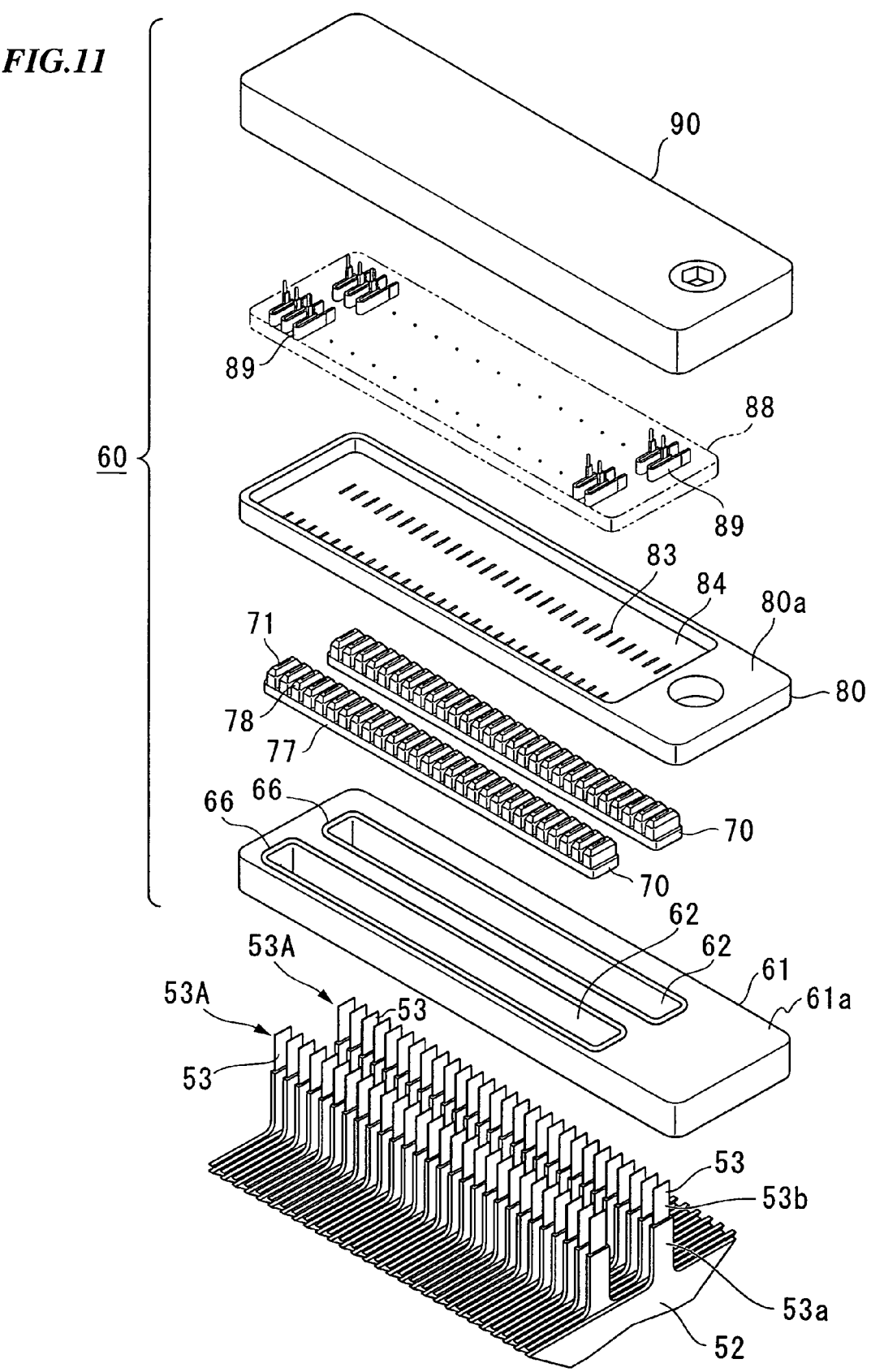
FIG. 11 is an exploded perspective view of the connector unit of a second embodiment.

As is shown in FIG. 11, the separators 52 are provided with plate-shaped terminals 53 that extend upwards from a top end portion of the separators 52. In a state in which the separators 52 are stacked, the placement positions of the terminals 53 are offset from each other in adjacent separators 52 and 52. As a result, two columns of terminal groups 53A and 53A are formed in columns running in the stacking direction. Base portions 53a of these terminals 53 are coated in rubber, while metal surfaces of distal end portions 53b thereof are exposed. The base portions 53a are inserted through windows (not shown) in the stack housing, and the distal end portions 53b protrude towards the connector unit 10.

The connector unit 10 is provided with a packing casing 61, two packings 70 and 70, a connector housing 80, and a cover 90.

The packing casing 61 is a member that is installed on a top portion of the stack housing. Packing housing concave portions 62 that are formed in a narrow, elongated shape running in the stacking direction of the separators 52 are provided in a relationship of 1 to 1 with each terminal group 53A on a top surface 61a of the packing casing 61 in positions corresponding to the terminal groups 53A and 53A. O-ring housing grooves 65 that encircle the circumference of each packing housing concave portion 62 are provided in a top surface 61a of the packing casing 61 (see FIG. 13), and an O-ring 66 is housed in each O-ring housing groove 65.

Figure 13:
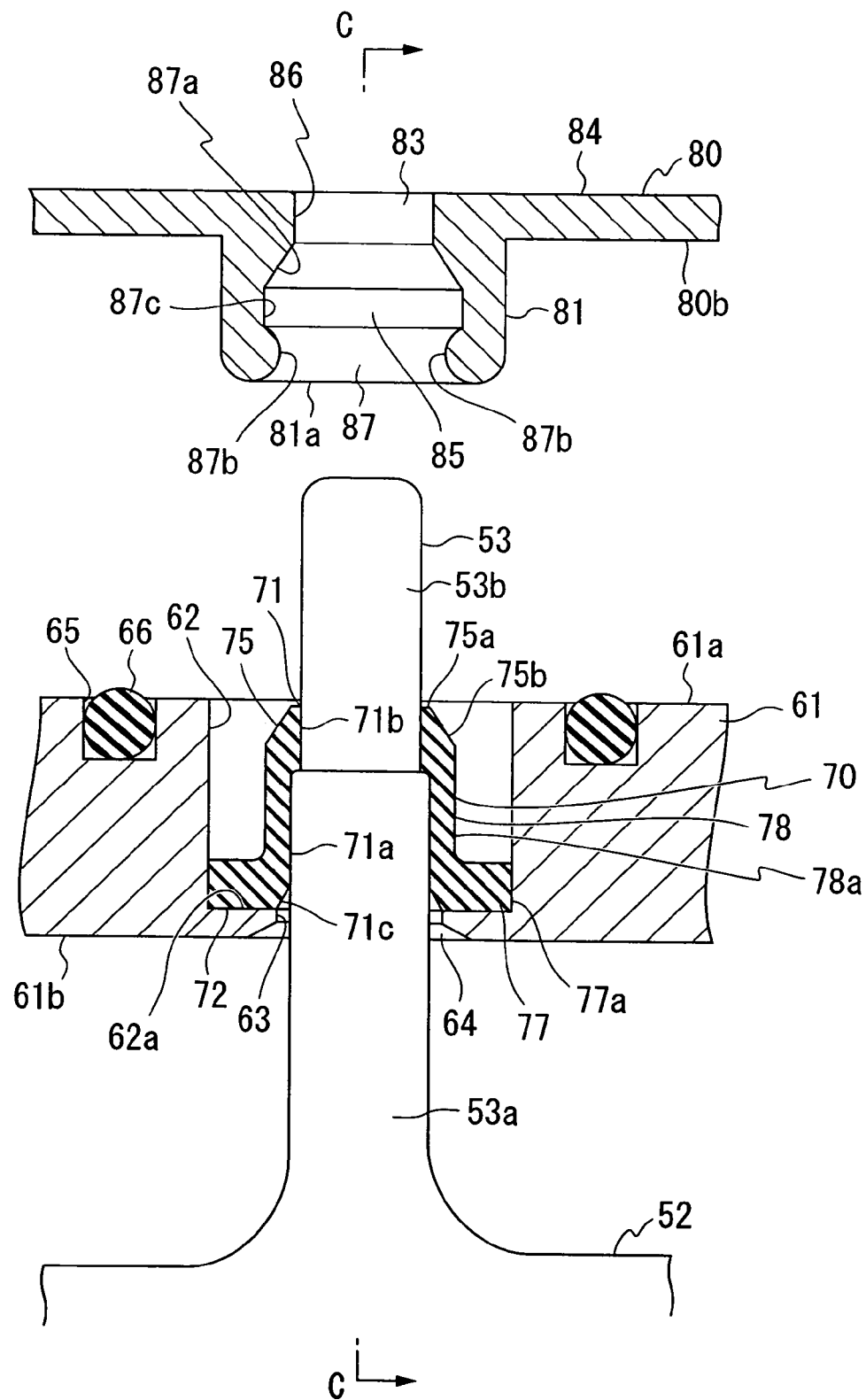
FIG. 13 is an enlarged cross-sectional view of the principal portions showing a state before the packing is compressed in the connector unit of this embodiment.
Figure 14:
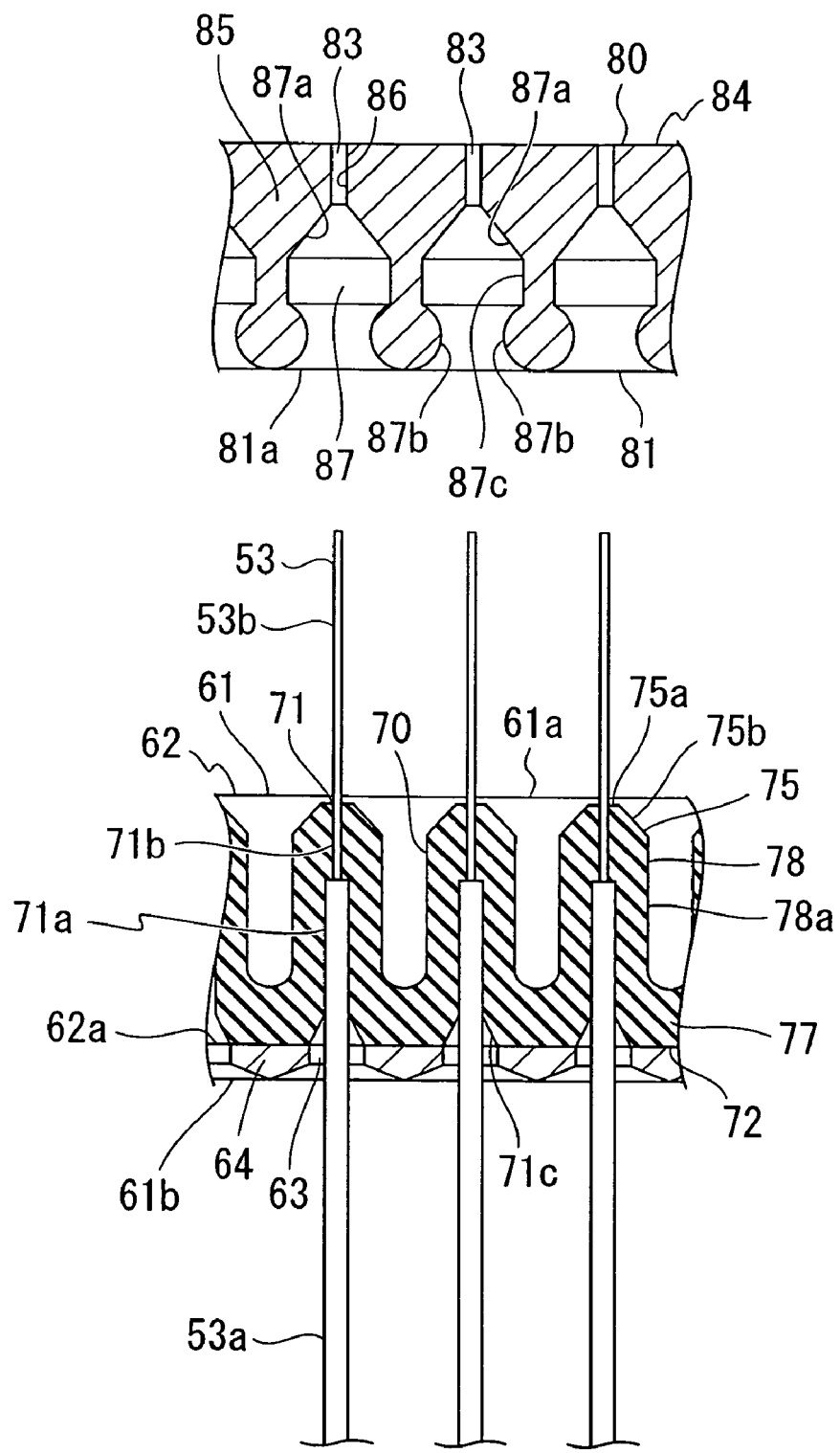
FIG. 14 is a cross-sectional view taken along the line C-C in FIG. 13.

As is shown in FIGS. 13 and 14, through holes 63 that penetrate the packing housing concave portions 62 from a bottom surface 61b are provided in a relationship of 1 to 1 with each terminal 53 at positions that correspond to the respective terminals 53 in the bottom surface 61b of the packing casing 61. A bridge portion 64 is provided between adjacent through holes 63 and 63 in the same terminal group 53A. Top surfaces of the bridge portions 64 are flush with a bottom surface 62a of the packing housing concave portions 62. The through holes 63 are formed at a size that enables a gap to be left when the terminals 53 are inserted therein, and the bottom side of the through holes 63 is formed as a tapered hole while the top side thereof is formed as a straight hole.

The packings 70 and 70 are formed from an elastic material, and they are contained respectively in the packing housing concave portions 62 of the packing casings 61. Examples of the elastic material used to form the packings 70 include nitrile rubber (NBR), hydrogenated nitrile rubber (HNBR), fluoro rubber (FKM, FFKM), acrylic rubber (ACM), silicone rubber (VMQ, FVMQ), urethane rubber (AU, EU), ethylene propylene rubber (EPM, EPDM), chloroprene rubber (CR), chlorosulfonated polyethylene (CSM), epichlorohydrin rubber (CO, ECO), isoprene rubber (IR), styrene butadiene rubber (SBR), butadiene rubber (BR), novornene rubber (NOR), natural rubber, and other thermoplastic elastomers.

Figure 12:
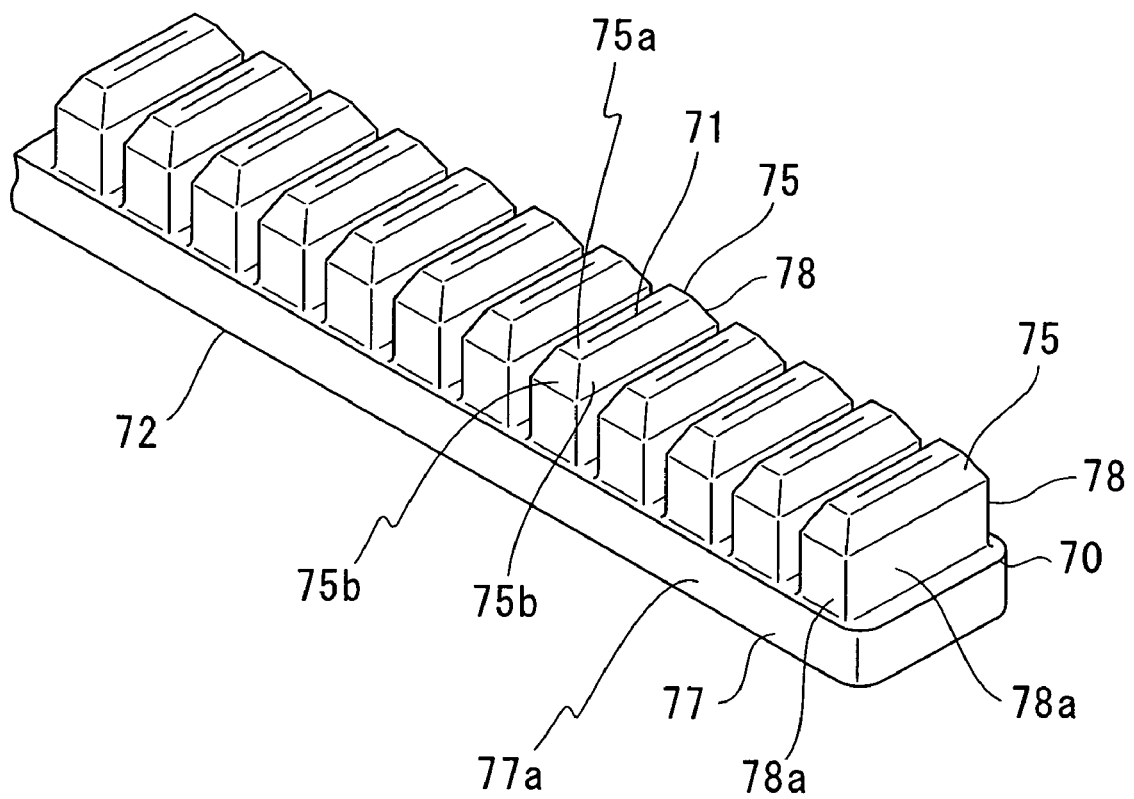
FIG. 12 is an external perspective view of packing used in this embodiment.

As is shown in FIGS. 12 to 14, the packings 70 are composed of substantially rectangular parallelepiped shaped base portions 77 and a number of protrusions (i.e., circumferential wall portions) 78 that protrude upwards from the base portions 77. The protrusions 78 are provided in a 1 to 1 relationship with the terminals 53.

The planar configuration and planar dimensions of the base portions 77 are set such that they can be contained in the packing housing concave portions 62 with substantially no gap between the two.

The protrusions 78 are formed in substantially rectangular parallelepiped shapes having four side surfaces 78a, and top surfaces of the protrusions 78 are formed as truncated pyramid shaped protruding portions 75. More specifically, the protruding portions 75 are formed as quadrangular pyramid base shapes (namely, quadrangular pyramids with the top portion removed) that are made up of a flat apex portion 75a and four tapered surfaces (i.e., side surfaces) 75b that are connected to the flat apex portion 75a and gradually widen towards the ends thereof. Each tapered surface 75b is continuous from a side surface 78a of the protrusions 78.

Through holes 71 through which the terminals 53 are inserted are formed in the packings 70 in a relationship of 1 to 1 with the terminals 53 so as to extend from a bottom surface 72 to the apex portion 75a of each protrusion 78. Namely, a protrusion 78 is provided independently for each through hole 71.

A bottom side portion of each through hole 71 is formed as a bottom portion through hole 71a through which the base portion 53a, which is covered by rubber, of the terminal 53 is inserted. The top side portion of each through hole 71 is formed as a top portion through hole 71b through which the distal end portion 53b, which has exposed metal surfaces, of the terminal 53 is inserted. The top portion through hole 71b opens onto a center of the apex portion 75a. The boundary between each bottom portion through hole 71a and top portion through hole 71b is positioned below the protruding portion 75 of each protrusion 78 and above the base portion 77. A horizontal cross section of the top portion through hole 71b is set so as to be smaller than that of the bottom portion through hole 71a. Moreover, a horizontal cross section of the bottom portion through hole 71a is set so as to be slightly smaller than the horizontal cross section of the base portion 53a of a terminal 53. In addition, the horizontal cross section of the top portion through hole 71b is set so as to be slightly smaller than the horizontal cross section of the distal end portion 53b of a terminal 53. A bottom edge portion of the bottom portion through hole 71a is formed as a tapered hole 71c that widens as it moves down.

Note that when the packings 70 are contained inside the packing housing concave portions 62, the packing housing concave portion 62 envelops side surfaces of the packing 70, namely, the side surfaces 77a of the base portion 77 and the side surfaces 78a of each protrusion 78 and supports the bottom surface 72 of the packing 70.

The connector housing 80 is placed on top of the packing casing 61, and applies pressing force to the packings 70 so as to compress the packings 70. The planar configuration and planar dimensions of the connector housing 80 are the same as those of the packing casing 61. As is shown in FIG. 11, a connector housing concave portion 84 is formed in a top surface 80a of the connector housing 80.

As is shown in FIGS. 13 and 14, narrow elongated protruding portions 81 and 81 are provided in parallel with each other at positions corresponding to the respective terminal groups 53A and 53A on the bottom surface 80b of the connector housing 80. The planar configuration and planar dimensions of each protruding portion 81 are set such that they can be inserted in the packing housing concave portions 62 of the packing casing 61 so that a small gap is left.

Through holes 83 that penetrate the connector housing concave portion 84 from the bottom surface 81a thereof are provided in a relationship of 1 to 1 with the terminals 53 at positions corresponding to the respective terminals 53. Adjacent through holes 83 are separated by bridge portions 85. Top portions of the through holes 83 that open onto the connector housing concave portion 84 form straight terminal insertion holes 86 through which the distal end portions 53b of the terminals 53 are inserted with a gap between themselves and the insertion holes 86. Bottom portions of the through holes 83 form packing containing holes 87 that house the protrusions 78 of the packings 70.

Internal surfaces of the top portions of the packing containing holes 87 that are continuous from the terminal insertion holes 86 form tapered surfaces 87a whose cross section becomes gradually narrower as it approaches the terminal insertion hole 86. The tapered surfaces 87a form a shape that conforms to the tapered surfaces 75b of the protruding portions 75 of the packings 70. The tapered surfaces 87a function as pressing surfaces that press the tapered surfaces 75b. In contrast, bulges 87b that bulge inwards and have a semicircular cross section are formed on bottom end internal surfaces of the packing containing holes 87. The internal dimension of the packing containing holes 87 at the maximum bulge point of the bulges 87b is slightly smaller than the external dimensions of the side surfaces 78a of the protrusions 78 of the packings 70, so that the bulges 87b function as pressing surfaces that press the side surfaces 78a of the protrusions 78. In addition, the bottom ends of the tapered surfaces 87a and the top ends of the bulges 87b are connected by flat surfaces 87c that are flat in the vertical direction.

As is shown in FIG. 11, a number of connectors 89 that are supported on a connector holder 88 are housed in the connector housing concave portion 84 of the connector housing 80. The connectors 89 are provided at positions corresponding to the respective terminal insertion holes 86, and are connected to a voltage measuring circuit substrate (not shown). When the connector unit 10 is correctly installed, the distal end portions 53b of the terminals 53 in each separator 52 are connected to each of the connectors 89.

The cover 90 is installed above the connector housing 80 and covers the connector housing concave portion 84. The planar configuration and planar dimensions thereof are the same as those of the connector housing 80.

Next, the procedure for attaching the connector unit 10 to the stack housing will be described. Note that, in the present embodiment, the connectors 89 are fixed in advance in the connector housing concave portion 84 of the connector housing 80.

Firstly, the terminals 53 of each separator 52 are inserted into the respective through holes 63 of the packing casing 61. In addition, the packing casing 61 is fixed by screws to the stack housing (not shown). When the packing casing 61 is fixed to the stack housing, each of the terminals 53 that has been inserted through the through holes 63 is in a state of protruding upwards inside the packing housing concave portions 62 of the packing casing 61. Next, the O-rings 66 are placed in the respective O-ring housing groove 65 in the packing casing 61. Note that the cross-sectional dimensions of the O-ring hosing grooves 65 and the O-rings 66 are set such that top end portions of the O-rings 66 protrude slightly from the top surface 61a of the packing casing 61.

Next, the packings 70 are placed inside the packing housing concave portions 62 while the respective terminals 53 are inserted in the through holes 71 in the packings 70. Here, because the horizontal cross sections of the through holes 71 in the packings 70 are slightly smaller than the horizontal cross sections of the terminals 53, the internal surfaces of the bottom portion through holes 71a are in tight contact with the external surfaces of the base portions 53a of the terminals 53, and the internal surfaces of the top portion through holes 71b are in tight contact with the external surfaces of the distal end portions 53b of the terminals 53. FIGS. 13 and 14 show states when the placing of the packings 70 inside the packing housing concave portions 62 has been completed. At this time, the bottom surfaces 62a of the packing housing concave portions 62 are in contact with the bottom surfaces 72 of the packings 70 so as to support the packings 70 from beneath, and the inner side surfaces of the packing housing concave portions 62 envelop the packings 70. In addition, the apex portions 75a of the packings 70 are positioned at substantially the same height as the top surface 61a of the packing casing 61, and the distal end portions 53b of the respective terminals 53 that penetrate the respective through holes 71 are in a state of protruding upwards beyond the top surface 61a of the packing casing 61. Accordingly, in the terminals 53, the base portions 53a that are covered by rubber remain inside the through holes 71 in the packings 70, and only the distal end portions 53b whose metal surfaces are exposed are exposed from the packings 70.

Next, the protruding portions 81 and 81 of the connector housing 80 are inserted into the packing housing concave portions 62 and 62 of the packing casing 61 while the respective terminals 53 that protrude from the packings 70 are being inserted into the respective through holes 83 of the connector housing 80, and the respective protrusions 78 of the packing 70 are inserted into the respective packing containing holes 87 in the protruding portions 81. At this time, the bulges 87b in the packing containing holes 87 are moved downwards while they press against the side surfaces 78a of the protrusions 78 of the packings 70 so as to compress these side surfaces 78a. Moreover, the tapered surface 87a of the respective packing containing holes 87 cover the tapered surfaces 75b of the respective protruding portions 75 of the packings 70, and the bottom surface 80b of the connector housing 80 is placed on top of the O-rings 66. Because the tapered surfaces 87a of the packing containing holes 87 have a configuration that conforms to the tapered surfaces 75b of the packings 70, the tapered surfaces 87a are in surface contact substantially uniformly with the tapered surfaces 75b. In this state, the bottom surface 80b of the connector housing 80 is positioned slightly away from the top surface 61a of the packing casing 61. Moreover, the distal end portions 53b of the respective terminals 53 that penetrate the through holes 83 are in a state of protruding upwards inside the connector housing concave portions 84, and each of the connectors 89 is connected to the distal end portion 53b of the terminals 53.

Figure 15:
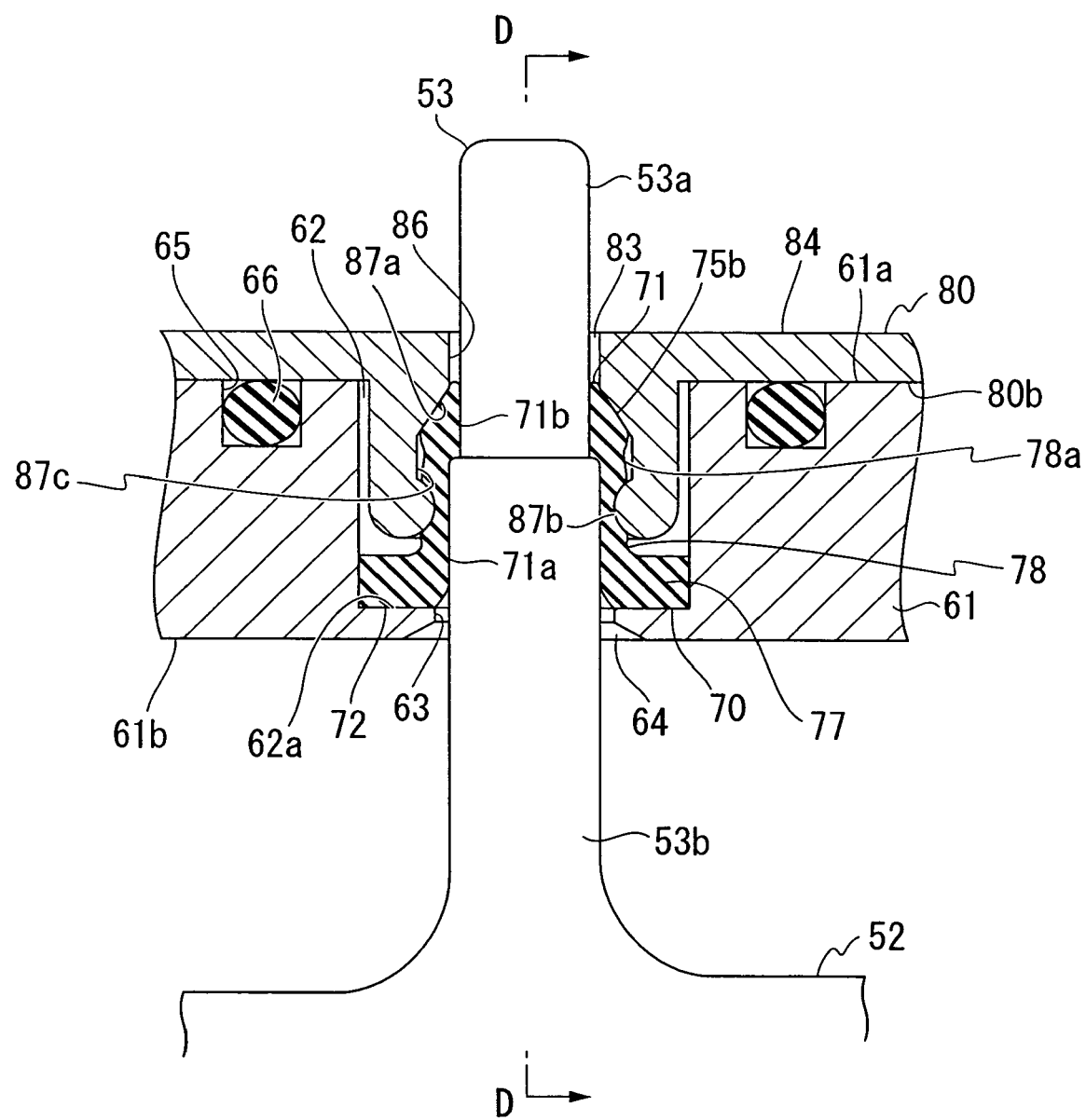
FIG. 15 is an enlarged cross-sectional view of the principal portions showing a state after the packing has been compressed in the connector unit of this embodiment.
Figure 16:
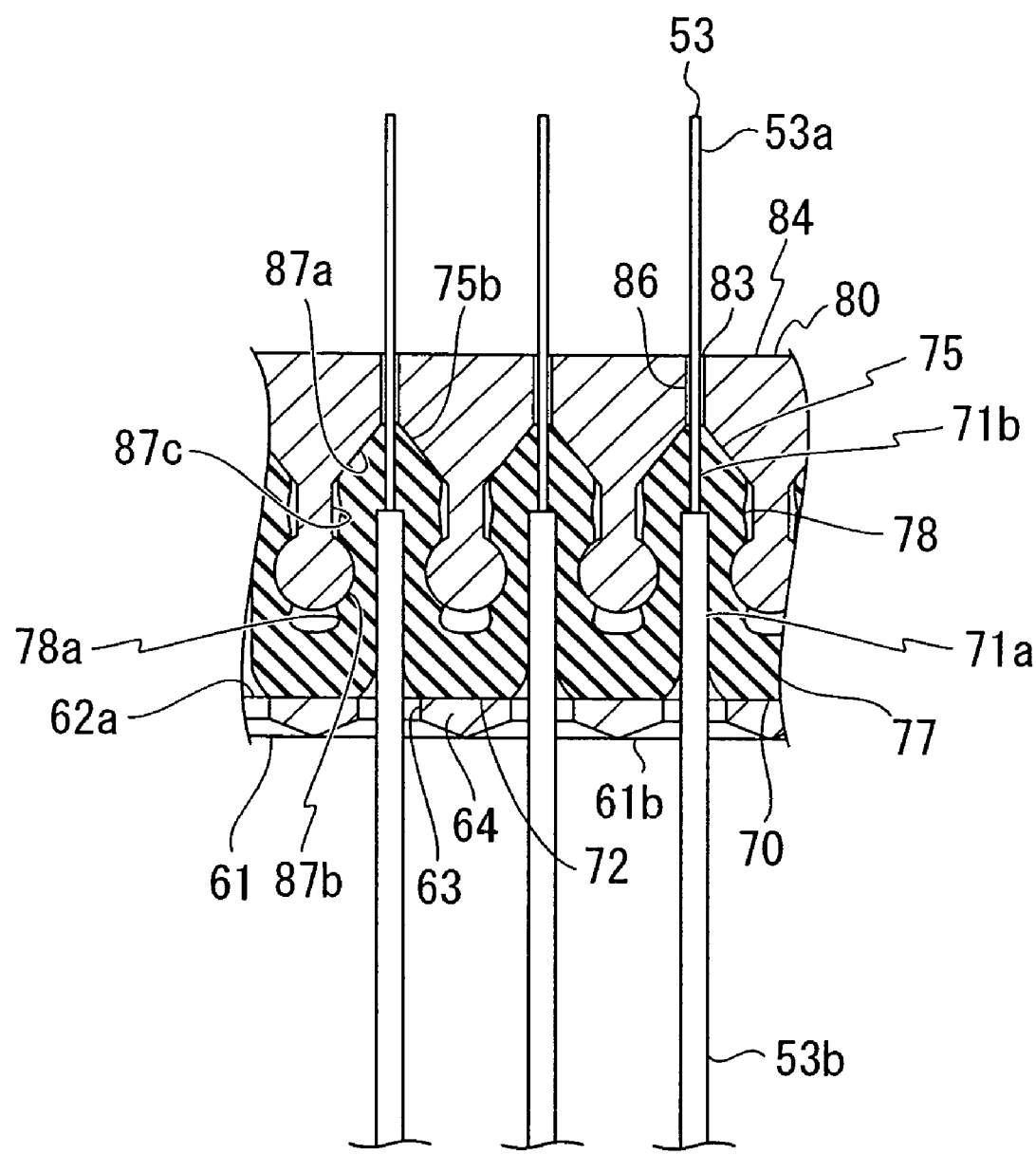
FIG. 16 is a cross-sectional view taken along the line D-D in FIG. 15.
Figure 17:
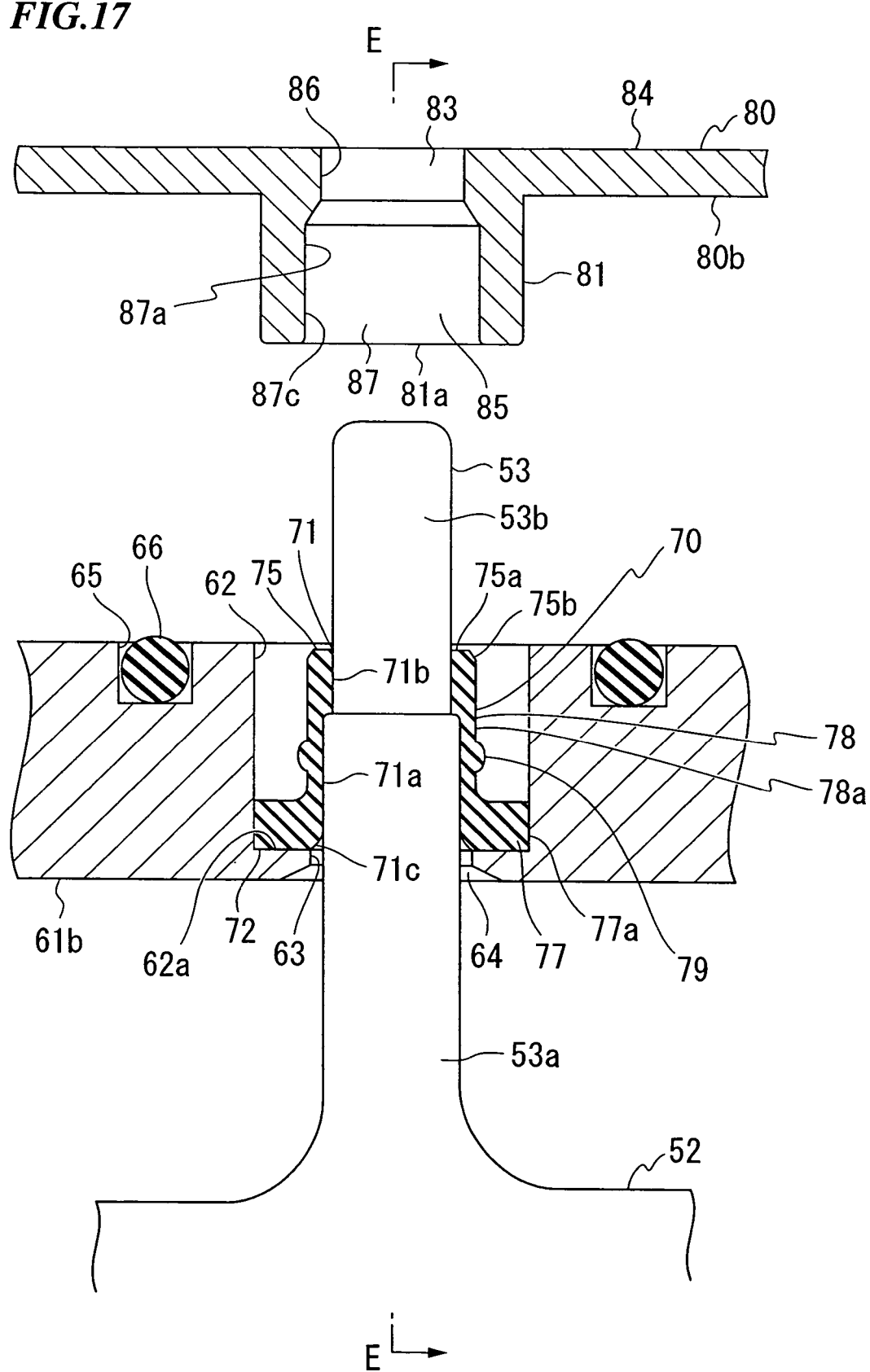
FIG. 17 is an enlarged cross-sectional view of the principal portions showing a state before the packing is compressed in the connector unit of yet another embodiment.
Figure 18:
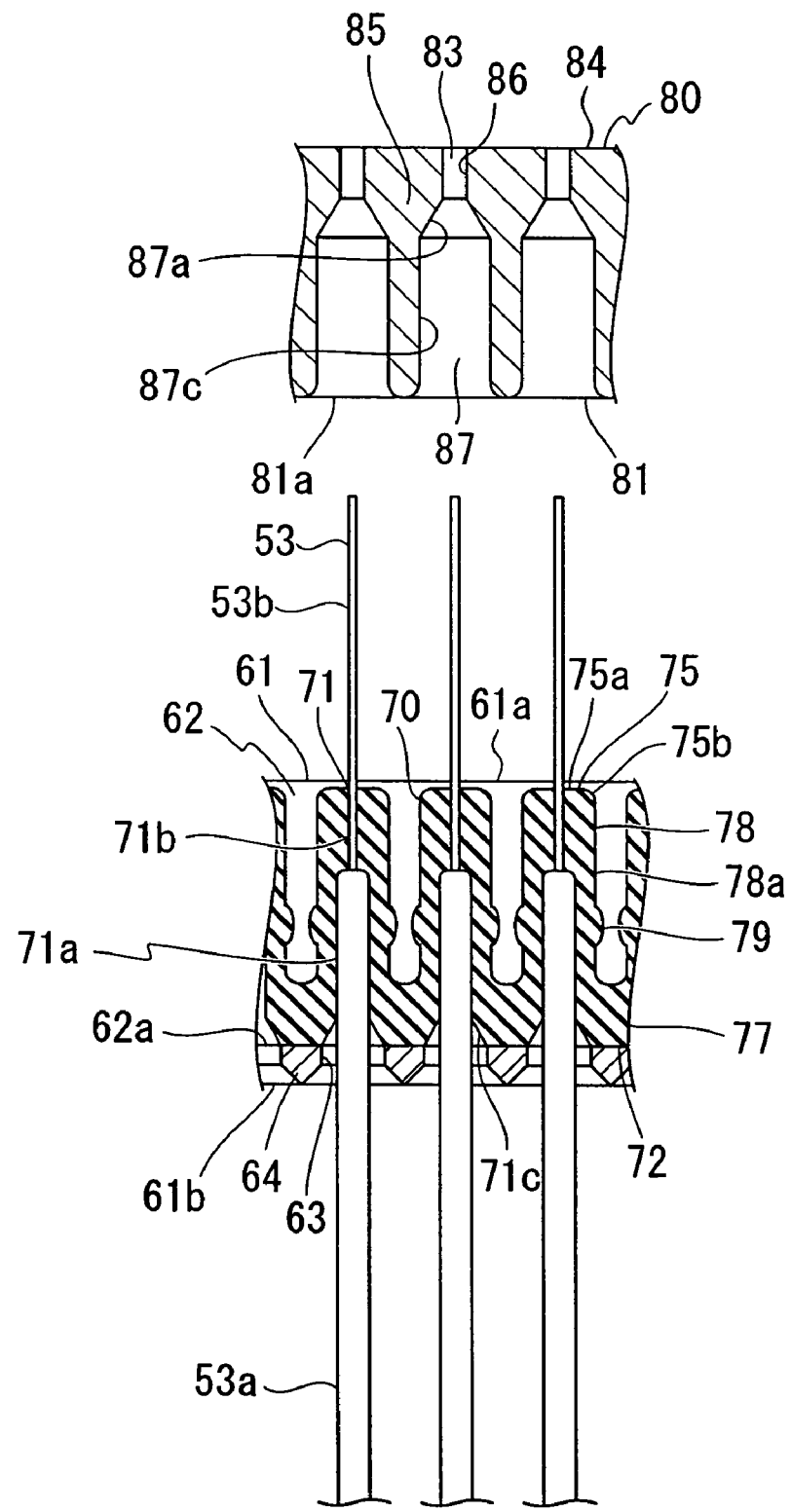
FIG. 18 is a cross-sectional view taken along the line E-E in FIG. 17.
Figure 19:
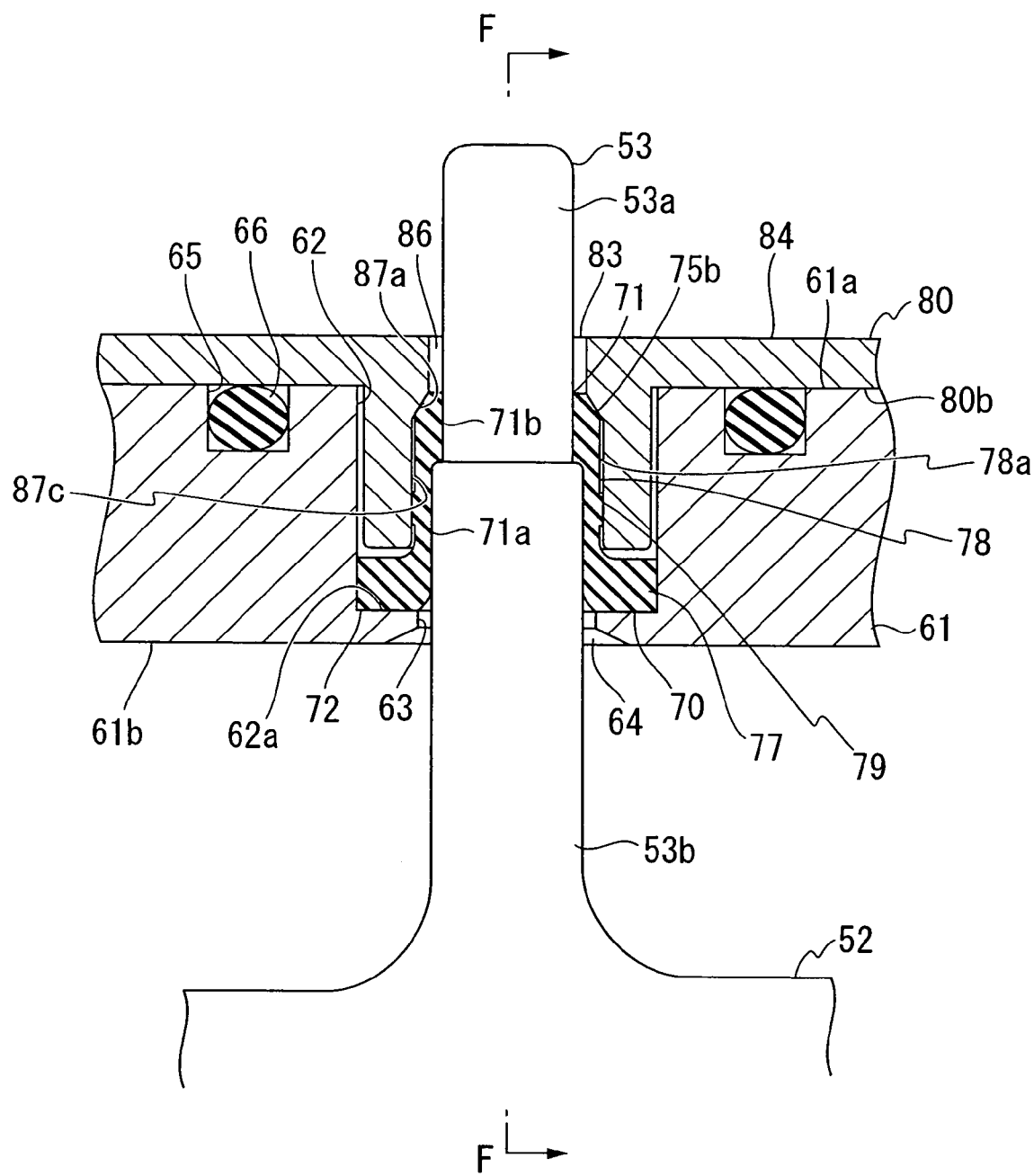
FIG. 19 is an enlarged cross-sectional view of the principal portions showing a state after the packing has been compressed in the connector unit of this embodiment.
Figure 20:
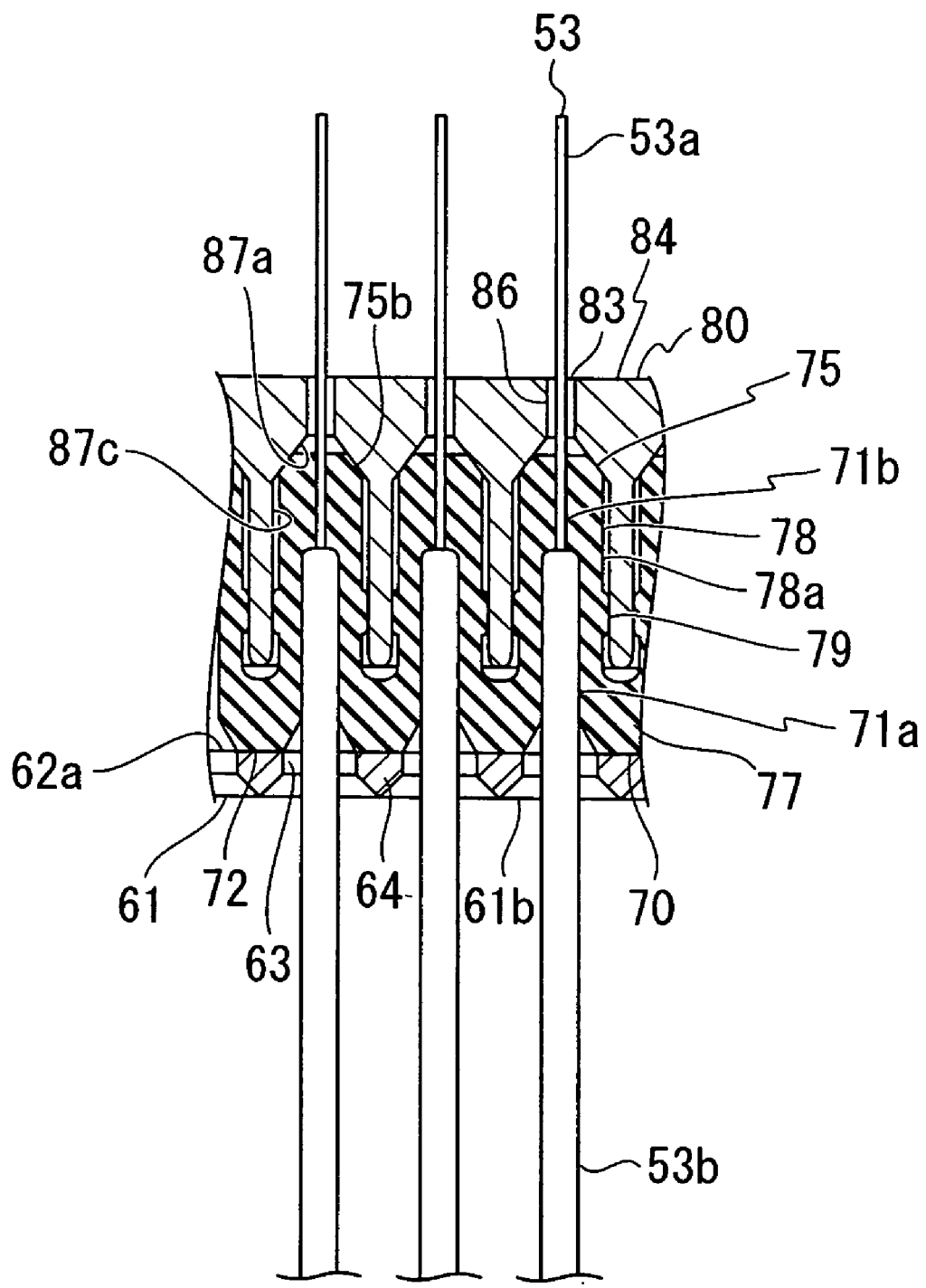
FIG. 20 is a cross-sectional view taken along the line F-F in FIG. 19.

Next, the cover 90 is placed on the connector housing 80 and, together with the connector housing 80 and the packing casing 61, it is fastened to the stack housing by bolts (not shown). FIGS. 15 and 16 show states in which this fastening is completed, however, the connectors 89 and the cover 90 have been omitted from these drawings.

As a result of this fastening, the O-rings 66 are pressed by the bottom surface 80b of the connector housing 80 so that the O-rings 66 are compressed, and the bottom surface 80b of the connector housing 80 is placed in contact with the top surface 61a of the packing casing 61. As a result, the O-rings 66 are in press contact with the bottom surface 80b of the connector housing 80 and the inner surface of the O-ring housing groove 65 of the packing casing 61. It is thus possible to reliably seal the gaps between the packing casing 61 and the connector housing 80, and it is possible to reliably prevent moisture from encroaching from the outside through these gaps into the packing housing concave portions 62.

The tapered surfaces 75b of the respective protruding portions 75 of the packings 70 are pressed and compressed by the tapered surfaces 87a of the respective packing containing holes 87 in the connector housing 80 so that both tapered surfaces 75b and 87a are in press contact with each other around each through hole 71 in the packings 70. In addition to this, the bulge portions 87b of the packing containing holes 87 press and compress the side surfaces 78a of the protrusions 78 on the packings 70 along the entire circumference thereof. As a result, it is possible to reliably prevent moisture from the outside from passing through the through holes 83 in the connector housing 80, and then passing between the internal surfaces of the packing containing holes 87 and the external surfaces of the packings 70 and encroaching into the packing collecting concave portions 62.

In addition, because the tapered surfaces 75b of the protruding portions 75 of the packings 70 are slanted, the contact area (namely, the area of the seal portion) between the tapered surfaces 75b and the tapered surfaces 87a of the packing containing holes 87 can be increased, and the performance of the seal between the two tapered surfaces 75b and 87a can be increased.

Furthermore, because the bottom surfaces 72 of the packings 70 are supported by the bottom surfaces 62a and the bridge portions 64 of the packing housing concave portions 62, and because the packings 70 are compressed while the tapered surfaces 87a of the packing housing concave portions 87 are in surface contact with the tapered surfaces 75b of the protruding portions 75 of the packings 70, the protruding portions 75 of the packings 70 are compressed by a force exerted obliquely inwards at all of the tapered surfaces 75b. Moreover, in addition to this, the bulge portions 87b of the packing containing holes 87 press and compress the side surfaces 78a of the protrusions 78 on the packings 70 along the entire circumference thereof. As a result, because the internal surfaces of the through holes 71 in the packings 70 are in tighter press-contact with the external surfaces of the terminals 53, the peripheries of the through holes 71 can be reliably sealed, and it is possible to reliably prevent moisture from the outside from encroaching into the stack housing via the gaps between the through holes 71 in the packings 70 and the terminals 53.

In addition, because the bottom surfaces 72 of the packings 70 are in tight press contact with the bottom surface 62a of the packing housing concave portions 62 of the packing casing 61 and with the top surface of the bridge portions 64, it is possible to reliably seal any gaps between the packing casing 61 and the packing 70, and it is possible to reliably prevent moisture from passing through these gaps and encroaching into the stack housing from the packing housing concave portions 62.

In this manner, according to the fuel cell stack 1 of the present embodiment, because it is possible to reliably seal the areas between the packing casing 61 and the connector housing 80, and between the packing casing 61 and the packings 70, and between the through holes 71 in the packings 70 and the terminals 53, and between the connector housing 80 and the packings 70, it is possible to reliably prevent moisture from encroaching from the outside into the stack housing, and it is possible to prevent short-circuiting inside the stack housing such as short-circuiting between cells.

Moreover, because it is possible to group together the plurality of terminals 53 that constitute the terminal group 53A and to seal them using a single packing 70, the waterproof structure of the connector unit 10 can be simplified.

Furthermore, because the positioning of the terminals 53 can be performed simply and accurately, the connections between the terminals 53 and the connectors 89 can be made easily.

Note that, as is shown in FIGS. 17 to 20, instead of providing the bulge portions 87b in the packing housing concave portions 87 of the connector housing 80, the same operation and effects as in the above described embodiments can be obtained even if a structure is employed in which the bulge portions 79 that bulge outwards at the side surfaces 78a on the protrusions 78 of the packings 70 are provided so as to encircle the side surfaces 78a, and when the protrusions 78 on the packing 70 are inserted into the packing containing holes 87, the bulge portions 79 of the packings 70 are pressed and compressed by the flat surfaces 87c of the packing containing holes 87. Note that, in this case, the flat surface 87c of the packing containing holes 87 in the connector housing 80 form the pressing surface.

Further Examples

Note that the present invention is not limited to the above described embodiment.

For example, it is possible to form the tapered surfaces 75b of the protruding portions 75 of the packings 70 so that they are joined by curved surfaces such that a ridge line is not created in the circumferential direction, and to form the side surfaces 78a of the protrusions 78 so that they are joined by a curved surface such that a ridge line is not created in the circumferential direction, and to form the packing containing holes 87 in the connector housing 80 with the same configuration. If this type of structure is employed, then because the protrusions 78 (i.e., the circumferential wall portions) on the packings 70 have a shape without a ridge line, the followingness of the packings 70 to the packing containing holes 87 when the packings 70 are deformed by being compressed is excellent, and the adhesion of the packings 70 to the packing containing holes 87 can be increased. As a result, the sealing performance can be further improved.

Moreover, in the above described embodiment, terminals 53 are provided for all the separators 52, however, it is also possible for the terminals 53 to be provided for just a portion of the separators 52.

According to the first embodiment of the present invention, the sealing performance between the through holes in the packing and the terminals is improved. Moreover, because the terminals can be positioned and placed in rows accurately, the terminals can be easily connected to the connectors of the connector member.

Moreover, according to another embodiment of the present invention, because it is possible to increase the contact area (namely, the area of the seal portion) between the protruding portions on the packings and the pressing surface of the connector members, and because it is possible to place the internal surfaces of the through holes in the packings in tighter press contact with the external surfaces of the terminals, the sealing performance is further improved.

According to another embodiment of the present invention, when the packings are compressed and deformed, the followingness of the protruding portions of the packings relative to the pressing surface is excellent, and it is possible to improve the adhesion to the pressing surface and further improve the sealing performance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A fuel cell stack that is provided with a plurality of stacked separators, comprising:
   terminals that extend from at least one of any separators;
   packing formed from an elastic material for preventing moisture from outside from encroaching into a stack housing, in which are formed a plurality of through holes through which the terminals are inserted;
   a packing casing that has a packing housing concave portion that envelops side surfaces of the packing and supports a bottom surface of the packing, and has through holes through which the terminals are inserted; and
   a connector member that has a plurality of pressing surfaces which correspond to the plurality of through holes formed in the packing, and which press a top surface of the packing, wherein
   internal surfaces of the through holes in the packing are in contact without a gap in between with external surfaces of the terminals.

2. The fuel cell stack according to claim 1, wherein the internal surfaces of the through holes in the packing are in contact without a gap in between with the external surfaces of the terminals before the packing is pressed.

3. The fuel cell stack according to claim 1, wherein mountain-shaped protruding portions whose apex portions are formed by circumferential edges of apertures of the respective through holes are provided on the top surface of the packing, and the pressing surfaces are formed in a configuration that conforms to the side surfaces of the protruding portions.

4. The fuel cell stack according to claim 3, wherein there is no ridge line on the side surfaces of the protruding portions.

5. The fuel cell stack according to claim 1, wherein each of the through holes in the packing comprises a bottom portion through hole and a top portion through hole located above the bottom portion through hole in conformity with the terminal comprising a base portion covered by resin and a distal end portion located above the base portion and having an exposed metal surface, the top portion through hole having a horizontal cross section smaller than that of the bottom portion through hole.

6. The fuel cell stack according to claim 1, wherein the packing is provided with a lip seal that encloses through holes on a bottom surface of the packing.

7. The fuel cell stack according to claim 5, wherein the internal surfaces of the through holes in the packing are in contact without a gap in between with the external surfaces of the terminals before the packing is pressed.

8. The fuel cell stack according to claim 1, wherein the packing is provided on a bottom surface thereof with a lip seal that enclose all the through holes at the bottom surface of the packing.

9. The fuel cell stack according to claim 5, wherein mountain-shaped protruding portions whose apex portions are formed by circumferential edges of apertures of the respective through holes are provided on the top surface of the circumferential wall portions of the packing, and the pressing surfaces that press these top surfaces are formed in a configuration that conforms to the mountain-shaped configuration of the protruding portions.

* * * * *